US008503590B2

(12) United States Patent
Tuskamizu et al.

(10) Patent No.: US 8,503,590 B2
(45) Date of Patent: Aug. 6, 2013

(54) RECEIVING APPARATUS FOR RECEIVING SIGNALS THROUGH ADAPTIVE ARRAY ANTENNA

(75) Inventors: Yuichiro Tuskamizu, Inuyama (JP); Yoshiharu Doi, Mizuho (JP); Keisuke Higuchi, Gifu-ken (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 447 days.

(21) Appl. No.: 12/787,179

(22) Filed: May 25, 2010

(65) Prior Publication Data
US 2010/0296607 A1    Nov. 25, 2010

(30) Foreign Application Priority Data

May 25, 2009 (JP) ................. 2009-125655
May 25, 2009 (JP) ................. 2009-125656
May 25, 2009 (JP) ................. 2009-125657

(51) Int. Cl.
*H04L 1/02* (2006.01)
(52) U.S. Cl.
USPC ........... 375/347; 375/267; 375/346; 329/318; 329/320; 329/349

(58) Field of Classification Search
USPC .................. 375/347, 267, 346; 329/318, 320, 329/349
See application file for complete search history.

(56) References Cited

U.S. PATENT DOCUMENTS 7,076,228 B1 * 7/2006 Rilling ....................... 455/278.1

OTHER PUBLICATIONS

Nobuyoshi Kikuma, "Adaptive Array Antenna Technology," pp. 11-19, Oct. 10, 2003, Ohmusha, Ltd. Japan, with English Translation.
Japanese Office Action with English Translation issued in Japanese Applicaiton No. 2009-125657 mailed Mar. 12, 2013.

* cited by examiner

*Primary Examiner* — Sam K. Ahn
*Assistant Examiner* — Leila Malek
(74) *Attorney, Agent, or Firm* — McDermott Will & Emery LLP

(57) ABSTRACT

Preceding filters receive the inputs of a plurality of received signals associated respectively with a plurality of antennas. Subsequent filters band-limit the plurality of inputted received signals, respectively. A first combining unit derives a weight vector for the plurality of band-limited received signals and performs array synthesis on the plurality of band-limited received signals, using the derived weight vector. The second combining unit performs array synthesis on the plurality of inputted received signal signals, using the derived weight vector. A demodulator demodulates the array-synthesis result.

7 Claims, 17 Drawing Sheets

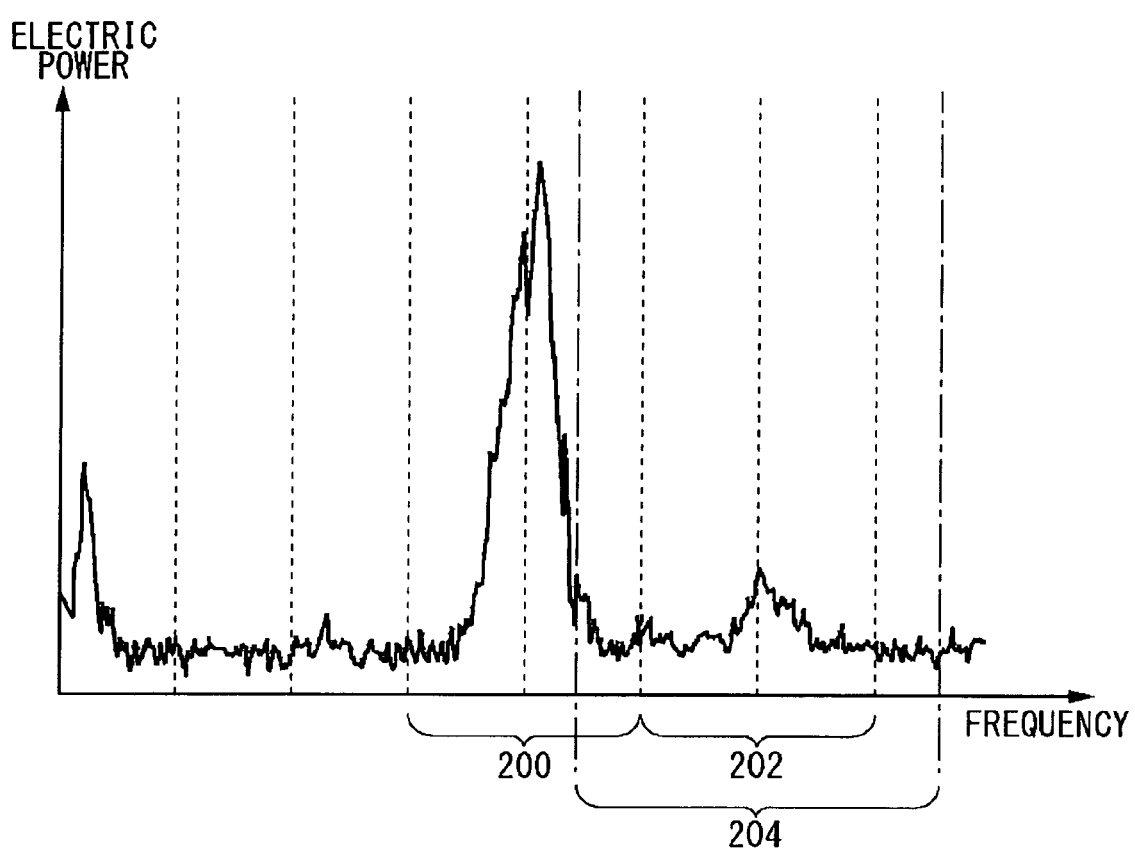

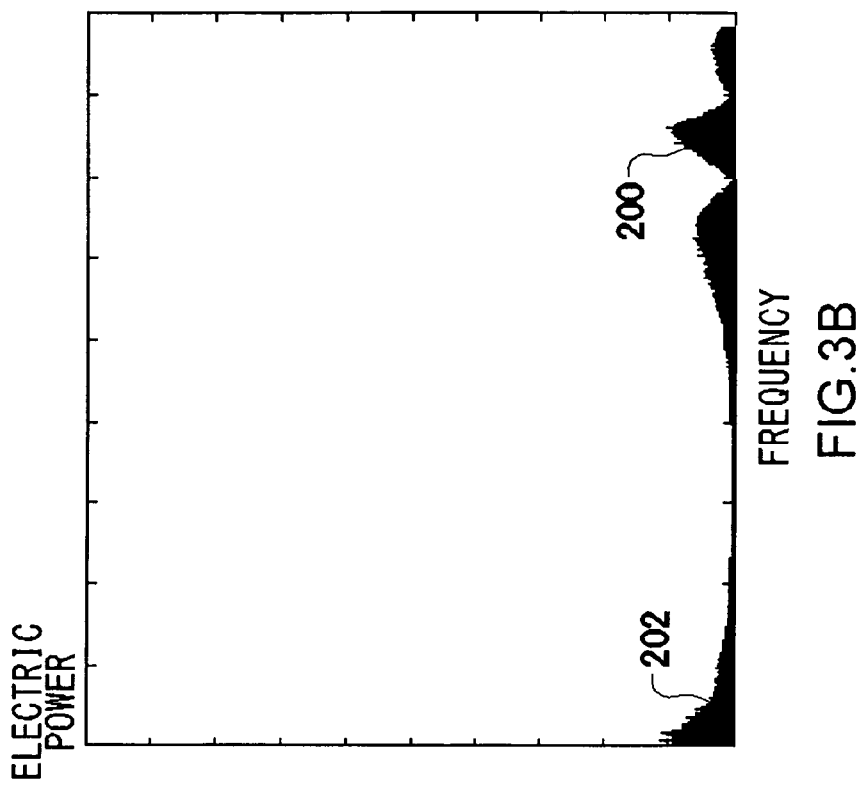
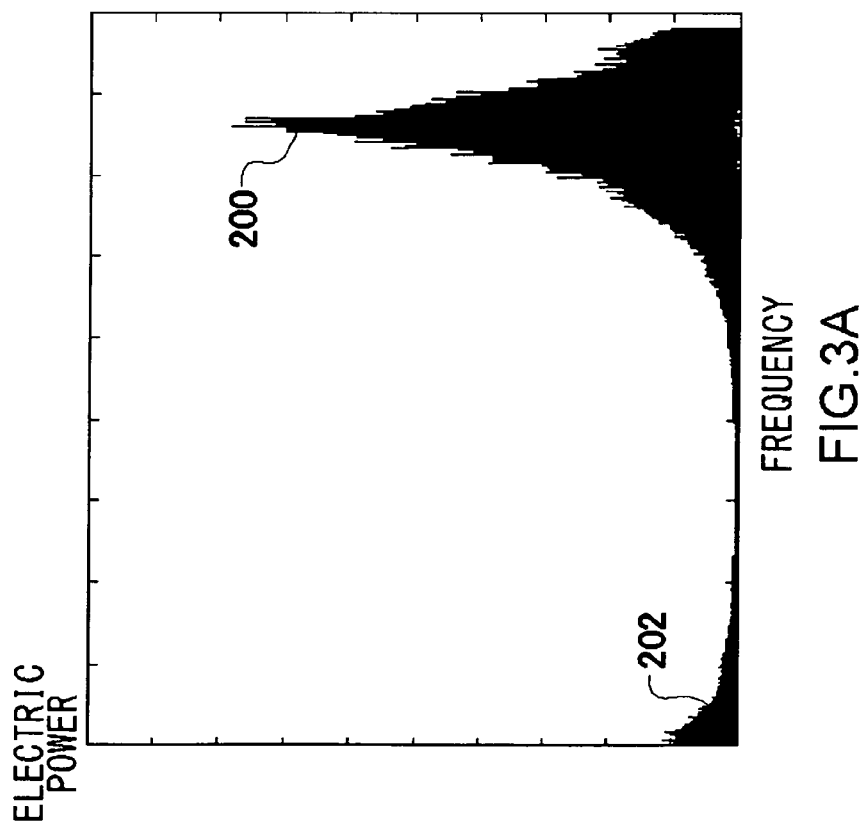

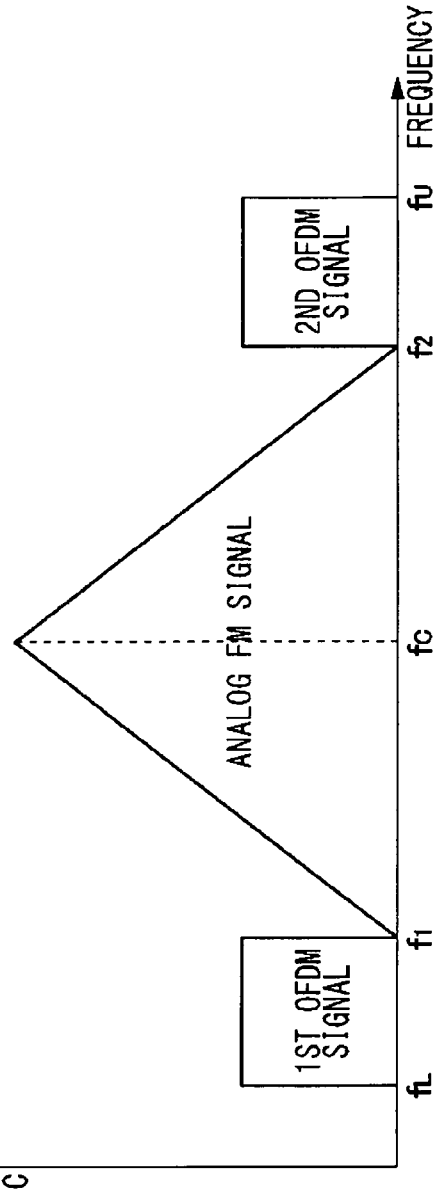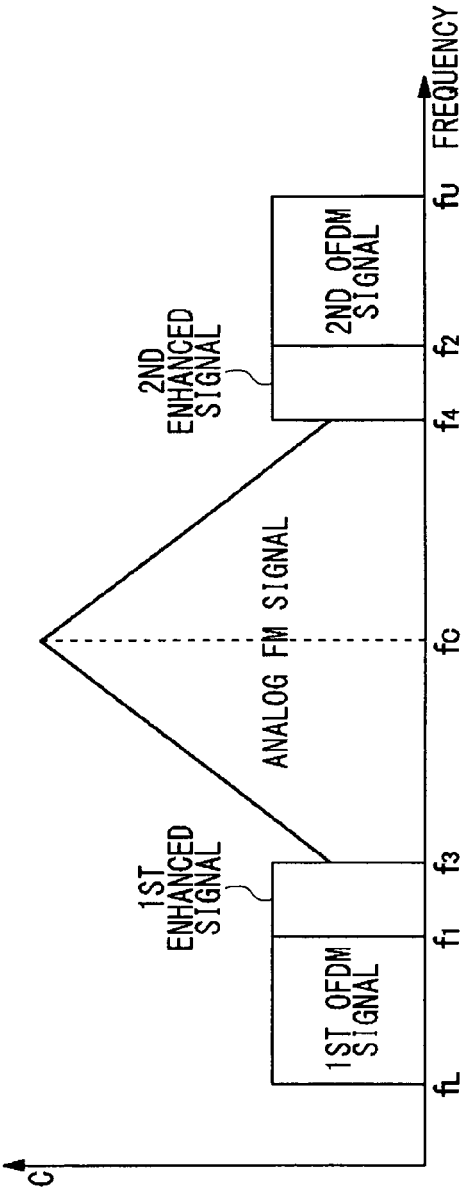

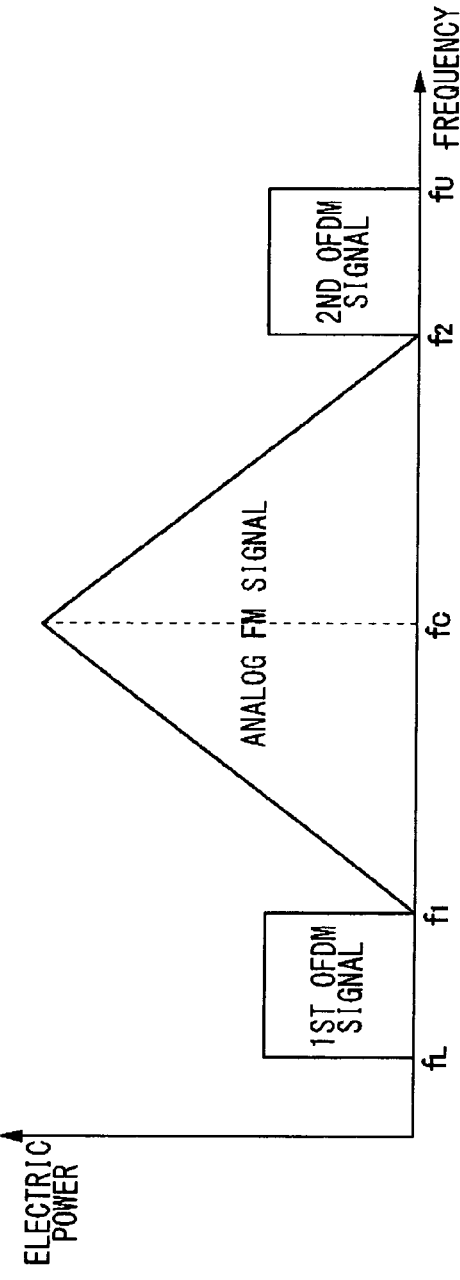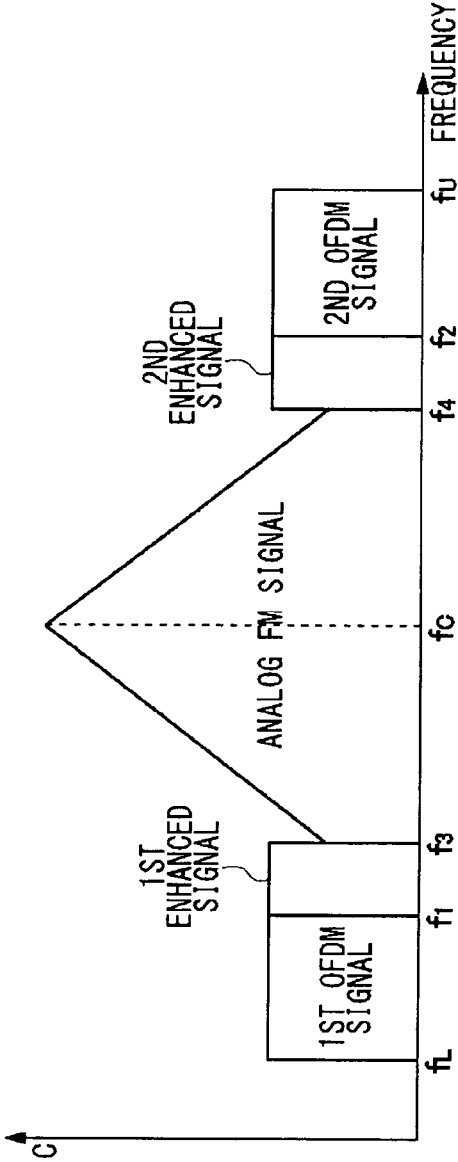

2016a

RECEIVING APPARATUS FOR RECEIVING SIGNALS THROUGH ADAPTIVE ARRAY ANTENNA

CROSS-REFERENCE TO RELATED APPLICATIONS

This application is based upon and claims the benefit of priority from the prior Japanese Patent Applications No. 2009-125655, filed on May 25, 2009, Japanese Patent Application No. 2009-125656, filed on May 25, 2009, and Japanese Patent Application No. 2009-125657, filed on May 25, 2009, the entire contents of which are incorporated herein by reference.

BACKGROUND OF THE INVENTION

1. Field of the Invention

The present invention relates to a receiving technology and, in particular, to a receiving apparatus for receiving signals through an adaptive array antenna.

2. Description of the Related Art

An adaptive-array antenna technique is a technique in which a plurality of antennas are arranged in array and the directivity is dynamically varied according to a radio wave environment. The function of adaptive array antennas is divided into an adaptive beamforming and an adaptive null steering. In the adaptive beamforming, a main beam is directed toward the arrival direction of signals to be received. In the adaptive null steering, the null in a directional pattern is formed in a direction of interference wave (See Reference (1) in the following Related Art List, for instance).

In the FM radio broadcasting, radio waves using a frequency modulation (hereinafter referred to as "FM") method are used to broadcast audio signals, such as verbal exchange (conversation) and music, to the general public. The FM conveys information through a change in frequency of carrier wave. Specifically, the frequency of carrier wave is lowered or raised by a signal voltage. As a result, the signal is expressed by the density degree of carrier wave. The maximum value and the minimum value of frequency are defined as a minimum frequency transition. For example, the maximum frequency transition is defined as ±75 kHz in the Radio Act. In the Radio Act, the occupied bandwidth up to 200 kHz (±100 kHz) is assigned to each FM broadcast station, based on the constraint of the maximum frequency transition of 75 kHz and 15 kHz for the signal wave frequency.

The use of adaptive array antennas is effective in enhancing the receiving characteristics of such FM radio broadcasting. If, however, the received power of signal coming from a station that one does not wish to receive the signal (hereinafter such a station will be referred to as "interfering station") is larger than that of signal coming from a station that one wishes to receive the signal (hereinafter such a station will be referred to as "desired station"), the main beam are sometimes directed toward the direction of an interfering station in the adaptive array antenna. To reduce the impact of the interfering stations, band limiting can be performed in such a manner that the signal only coming from the desired station is extracted. However, such band limiting causes the audio quality to deteriorate. Further, the radio wave environment varies if the receiving apparatus changes its location. Thus, a weight vector of the adaptive array antenna also varies. Thus, the receiving condition of signals will be more stabilized if the weight vector thereof can be estimated and then controlled.

Similar to the transition occurring from analog television broadcasting to digital television broadcasting, a transition from analog radio broadcasting to digital radio broadcasting is under consideration. One way to realize the transition, digital radio signals are broadcast independently of analog FM radio signals, in a similar manner to the television broadcasting. Another way to realize the transition, signal is broadcast in such a manner that the digital radio signal is appended to the analog FM signal. In the latter case, signals in which analog FM signals and digital radio signals are combined together (hereinafter such combined signal will be referred to as "hybrid signal") are broadcast, so that this may be called hybrid broadcasting. In the hybrid broadcasting, digital data with high sound quality are reproduced if the receiving apparatus can receive digital radio signals. The conventional analog data are reproduced if the receiving apparatus cannot receive digital radio signals. Accordingly, no burden of urgent equipment investment is placed on broadcasters or general users in the hybrid broadcasting. To improve the receiving characteristics of such hybrid broadcasting, the use of adaptive array antenna is effective. Note that different types of signals are contained in the hybrid broadcasting. As a result, adaptive array processing must be carried out even when the different types of signals are contained therein.

SUMMARY OF THE INVENTION

The present invention has been made in view of such circumstances, and a purpose thereof is to provide a technology by which to improve the receiving characteristics while the degradation in sound quality is suppressed even in an environment where interference signals are present. Another purpose thereof is to provide a technology for performing adaptive array processing in a case where different types of signals are contained in a received signal.

In order to resolve the above-described problems, a receiving apparatus according to one embodiment of the present invention comprises: an input unit configured to receive the input of a plurality of received signals corresponding respectively to a plurality of antennas; a band limiting unit configured to band-limit the plurality of received signals, respectively, inputted by the input unit; a first combining unit configured to derive a weight vector for the plurality of received signals which have been band-limited by the band-limiting unit and configured to perform array synthesis on the plurality of received signals which have been band-limited by the band limiting unit, using the derived weight vector; a second combining unit configured to perform array synthesis on the plurality of received signals inputted by the input unit, using the weight vector derived by the first combining unit; and an output unit configured to output an array-synthesis result in the second combining unit.

Another embodiment of the present invention relates also to a receiving apparatus. The receiving apparatus comprises: a conversion unit configured to carry out frequency conversion of a plurality of received signals corresponding respectively to a plurality of antennas; a preceding limiting unit configured to band-limit the plurality of received signals, respectively, which have been subjected to frequency conversion by the conversion unit; a band limiting unit configured to band-limit the plurality of received signals, respectively, which have been band-limited by the preceding limiting unit; a first combining unit configured to derive a weight vector for the plurality of received signals which have been band-limited by the band-limiting unit and configured to perform array synthesis on the plurality of received signals which have been band-limited by the band limiting unit, using the derived weight vector; a second combining unit configured to perform array synthesis on the plurality of received signals which have been band-limited by the band limiting unit, using the weight vector derived by the first combining unit; and an output unit configured to output an array-synthesis result in the second combining unit. The bandwidth in band-limiting by the preceding limit unit is wider than the bandwidth in band-limiting by the band limiting unit.

Still another embodiment of the present invention relates also to a receiving apparatus. The receiving apparatus comprises:

5. A receiving apparatus, comprising: an input unit configured to receive the input of a plurality of received signals corresponding respectively to a plurality of antennas; a band limiting unit configured to band-limit the plurality of received signals, respectively, inputted by the input unit; a first combining unit configured to derive a weight vector for the plurality of received signals which have been band-limited by the band-limiting unit and configured to perform array synthesis on the plurality of received signals which have been band-limited by the band limiting unit, using the derived weight vector; a signal delay unit configured to delay the plurality of received signals, respectively, inputted by the input unit; a second combining unit configured to perform array synthesis on the plurality of received signals delayed by the signal delay unit, using the weight vector derived by the first combining unit; and an output unit configured to output an array-synthesis result in the second combining unit.

Still another embodiment of the present invention relates also to a receiving apparatus. The receiving apparatus comprises: a plurality of antennas; a band limiting unit configured to a plurality of received signals corresponding respectively to the plurality of antennas; a first combining unit configured to derive a weight vector for the plurality of received signals which have been band-limited by the band-limiting unit and configured to perform array synthesis on the plurality of received signals which have been band-limited by the band limiting unit, using the derived weight vector; a signal delay unit configured to delay the plurality of received signals corresponding respectively to the plurality of antennas; a second combining unit configured to perform array synthesis on the plurality of received signals delayed by the signal delay unit, using the weight vector derived by the first combining unit; and an output unit configured to output an array-synthesis result in the second combining unit.

Still another embodiment of the present invention relates also to a receiving apparatus. The receiving apparatus comprises: an input unit configured to receive the input of a plurality of received signals corresponding respectively to a plurality of antennas, the received signals being such that OFDM signals and FM signals are subjected to frequency-division multiplexing; a first conversion unit configured to convert the plurality of received signals, respectively, inputted by the input unit into frequency domain; an insertion unit configured to insert zero into a subcarrier that differs from a subcarrier to which a known signal is assigned, for each of the plurality of received signals which have been converted by the first conversion unit, wherein the known signal is assigned to a subcarrier of a part of OFDM signal in each of the plurality of received signals which have been converted by the first conversion unit; a second conversion unit configured to convert the plurality of received signals, respectively, to which zeros are inserted by the insertion unit, into time domain; a first combining unit configured to derive a weight vector for the plurality of received signals which have been converted by the second conversion unit and configured to perform array synthesis on the plurality of received signals which have been converted by the second conversion unit, using the derived weight vector; a second combining unit configured to perform array synthesis on the plurality of received signals inputted by the input unit, using the weight vector derived by the first combining unit; and an output unit configured to output an array-synthesis result in the second combining unit.

Still another embodiment of the present invention relates also to a receiving apparatus. The receiving apparatus comprises: an input unit configured to receive the input of a plurality of received signals corresponding respectively to a plurality of antennas, the received signals being such that OFDM signals and FM signals are subjected to frequency-division multiplexing; a band limiting unit configured to band-limit the plurality of received signals respectively inputted by the input unit to reduce OFDM signal components contained in received signals respectively inputted by the input unit; a first combining unit configured to derive a weight vector for the plurality of received signals which have been band-limited by the band limiting unit and configured to perform array synthesis on the plurality of received signals which have been band-limited by the band limiting unit, using the derived weight vector; a second combining unit configured to perform array synthesis on the plurality of received signals inputted by the input unit, using the weight vector derived by the first combining unit; and an output unit configured to output an array-synthesis result in the second combining unit.

Still another embodiment of the present invention relates also to a receiving apparatus. The receiving apparatus comprises: a plurality of antennas; a first conversion unit configured to convert a plurality of received signals corresponding respectively to the plurality of antennas, into frequency domain, respectively, the received signals being such that OFDM signals and FM signals are subjected to frequency-division multiplexing; an insertion unit configured to insert zero into a subcarrier that differs from a subcarrier to which a known signal is assigned, for each of the plurality of received signals which have been converted by the first conversion unit, wherein the known signal is assigned to a subcarrier of a part of OFDM signal in each of the plurality of received signals which have been converted by the first conversion unit; a second conversion unit configured to convert the plurality of received signals, respectively, to which zeros are inserted by the insertion unit, into time domain; a first combining unit configured to derive a weight vector for the plurality of received signals which have been converted by the second conversion unit and configured to perform array synthesis on the plurality of received signals which have been converted by the second conversion unit, using the derived weight vector; a second combining unit configured to perform array synthesis on the plurality of received signals corresponding respectively to the plurality of antennas, using the weight vector derived by the first combining unit; and an output unit configured to output an array-synthesis result in the second combining unit.

Still another embodiment of the present invention relates also to a receiving apparatus. The receiving apparatus comprises: a plurality of antennas; a band limiting unit configured to band-limit a plurality of received signals corresponding respectively to the plurality of antennas to reduce OFDM signal components contained in received signals corresponding respectively to the plurality of antennas, the received signals being such that OFDM signals and FM signals are subjected to frequency-division multiplexing; a first combining unit configured to derive a weight vector for the plurality of received signals which have been band-limited by the band limiting unit and configured to perform array synthesis on the plurality of received signals which have been band-limited by the band limiting unit, using the derived weight vector; a second combining unit configured to perform array synthesis on the plurality of received signals corresponding respectively to the plurality of antennas, using the weight vector derived by the first combining unit; and an output unit configured to output an array-synthesis result in the second combining unit.

Optional combinations of the aforementioned constituting elements, and implementations of the invention in the form of methods, apparatuses, systems, recording media, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 2 shows the spectrum of a signal received by the receiving apparatus of FIG. 1;

FIGS. 3A and 3B show the effects of a subsequent filter shown in FIG. 1;

FIGS. 13A and 13B each shows the spectrum of a signal received by a receiving apparatus according to still another modification of the exemplary embodiment;

FIGS. 15A and 15B each shows the spectrum of a signal received by the receiving apparatus of FIG. 14;

DETAILED DESCRIPTION OF THE INVENTION

The invention will now be described by reference to the preferred embodiments. This does not intend to limit the scope of the present invention, but to exemplify the invention.

An outline of the present invention will be given before a specific description thereof. Exemplary embodiments of the present invention relate to a receiving apparatus that receives analog FM signals broadcast from FM broadcast stations. Each FM broadcast station is assigned a channel having a bandwidth of 200 kHz. The receiving apparatus receives an analog FM signal placed in a channel by tuning in this desired channel. To enhance the receiving quality, the receiving apparatus has a configuration of adaptive array antenna. If the received power of analog FM signal coming from an interfering station (hereinafter such a signal will be referred to as "interference wave") is larger than that of analog FM signal coming from a desired station (hereinafter such a signal will be referred to as "desired wave"), the receiving apparatus according to the present exemplary embodiment will perform the following processing not to direct a main lobe toward the interference wave. Assume herein below for ease of explanation that the interference wave is placed in an adjacent channel of desired wave. As described above, in order to suppress the degradation of quality of reproduced audio, the receiving apparatus is not allowed to perform adaptive array control after the desired waves only have been extracted through a filter.

The receiving apparatus according to the present exemplary embodiment separates a received baseband signal into two signals. One of the received signals that have been separated is band-limited by the filter. Here the filter has a passband width that allows to pass not only desired wave but also a part of interference wave. If a received signal that has been band-limited in this manner is demodulated, the sound quality will generally deteriorate as described above. The receiving apparatus derives a weight vector based on the received signal that has been band-limited, and band-limited received signal is subjected to array synthesis using the thus derived weight vector. Also, the receiving apparatus carries out array synthesis on the other received signal, namely the received signal that is not band-limited, using the derived weight vector. The latter array-synthesis result is demodulated.

Figure 1:
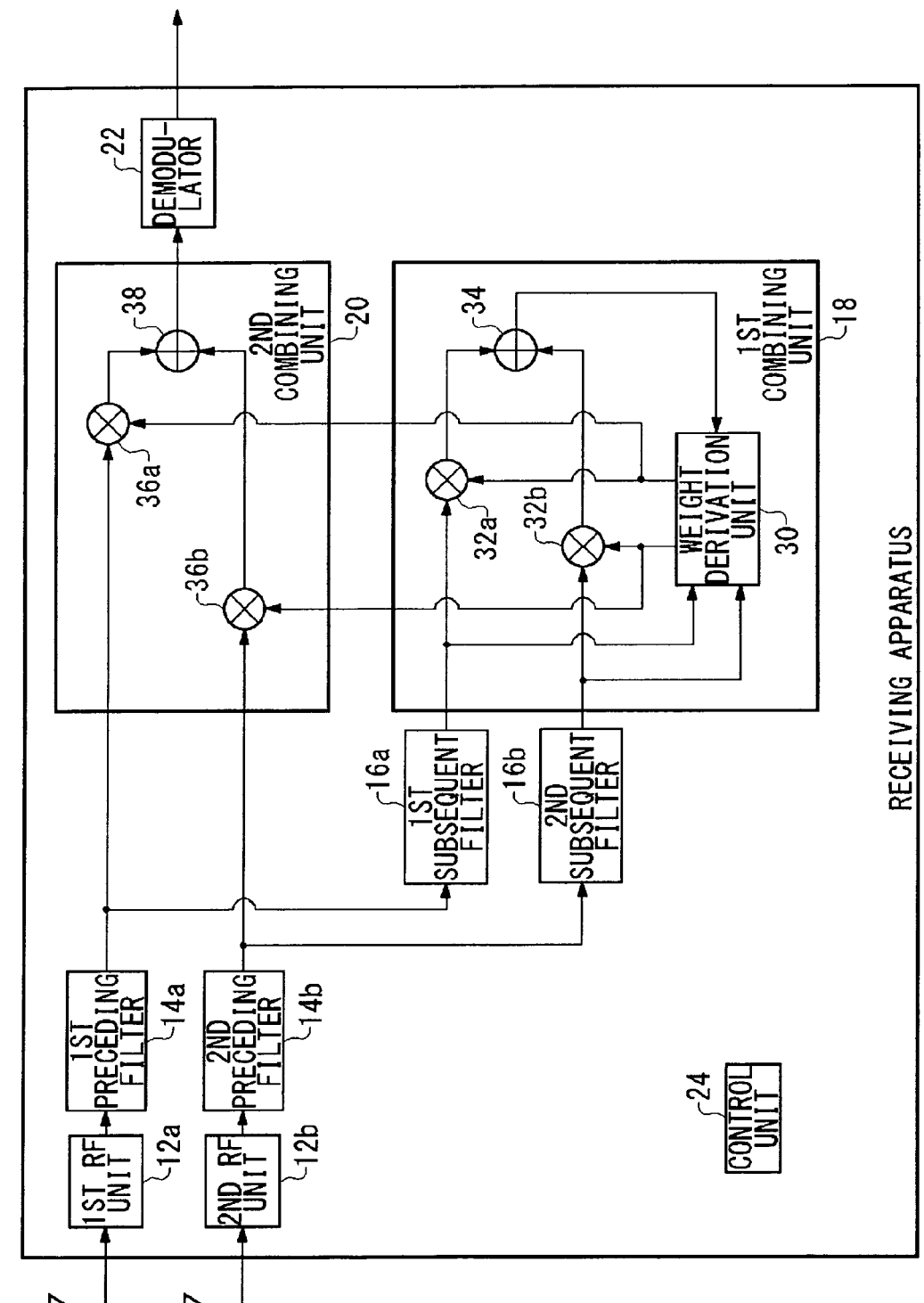
FIG. 1 shows a structure of a receiving apparatus according to an exemplary embodiment of the present invention.

FIG. 1 shows a structure of a receiving apparatus 100 according to an exemplary embodiment of the present invention. The receiving apparatus 100 includes a first antenna 10a and a second antenna 10b, which are generically referred to as "antenna 10" or "antennas 10", a first RF unit 12a and a second RF unit 12b, which are generically referred to as "RF unit 12" or "RF units 12", a first preceding filter 14a and a second preceding filter 14b, which are generically referred to as "preceding filter 14" or "preceding filters 14", a first subsequent filter 16a and a second subsequent filter 16b, which are generically referred to as "subsequent filter 16" or "subsequent filters 16", a first combining unit 18, a second combining unit 20, a demodulator 22, and control unit 24. The first combining unit 18 includes a weight derivation unit 30, a first multiplier 32a and a second multiplier 32b, which are generically referred to as "multiplier 32" or "multipliers 32", and an adder 34. The second combining unit 20 includes a first multiplier 36a and a second multiplier 36b, which are generically referred to as "multiplier 36" or "multipliers 36", and an adder 38.

Each of a plurality of antennas 10 receives a signal broadcast from a not-shown FM broadcast station. The signals received by the antennas 10 include desired wave and interference wave. FIG. 2 shows an example of the spectrum of a signal received by the receiving apparatus 100. The horizontal axis in FIG. 2 represents the frequency, whereas the vertical axis represents the electric power. A desired station band 202 corresponds to the band assigned to a desired station. As described above, the desired station band 202 occupies the bandwidth of ±100 kHz from the center thereof and therefore occupies the bandwidth of 200 kHz. An interfering station band 200 is placed adjacent to the desired station band 202. The interfering station band 200 corresponds to the band assigned to the interfering station and occupies the same bandwidth as the interfering band 200. As shown in FIG. 2, assumed herein is a case where the received power of interference wave is larger than that of desired wave. In such a case, as described above, the main lobe is directed toward the interference wave if the adaptive array processing is carried out. A subsequent filter band 204 will be discussed later. Now refer back to FIG. 1.

The RF units 12 are arranged in one-to-one correspondence to a plurality of antennas 10. The RF unit 12 receives a signal received by the antenna 10 (hereinafter referred to as "received signal"). Here, the received signal is a radiofrequency signal. The RF unit 12 carries out frequency conversion of received radiofrequency signal so as to generate a baseband received signal (hereinafter referred to as "received signal"). The baseband signal, which is composed of in-phase components and quadrature components, shall generally be indicated by two signal lines. For the clarity of figure, however, the baseband signal is presented here by a single signal line only. Also, the RF unit 12 includes a low noise amplifier (LNA), a mixer and an A-D converter. Further, the RF unit 12 outputs the received signal to the preceding filter 14.

The preceding filters 14 are arranged in one-to-one correspondence to the RF units 12, and the preceding filters 14 receive the received signals fed from the RF units 12. The preceding filter 14 band-limits the received signal. For example, the preceding filter 14 is constituted by a low-pass filter. Here, the preceding filter 14 is provided for the purpose of reducing a harmonic component contained in the received signal. Thus, the preceding filter 14 has a bandwidth covering the desired station band 202 and the interfering station band 200 of FIG. 2. The preceding filter 14 outputs the band-limited received signal (hereinafter this signal will also be referred to as "received signal") to the second combining unit 20 and the subsequent filter 16.

The subsequent filters 16a and 16b are arranged correspondingly to the preceding filters 14a and 14b, respectively, and the subsequent filters 16 receive the received signals fed from the preceding filters 14. Similar to the preceding filter 14, the subsequent filter 16 band-limits the received signal. Similar to the preceding filter 14, the subsequent filter 16 is constituted by a low-pass filter. However, the bandwidth of the subsequent filter 16 differs from that of the preceding filter 14. The bandwidth of the subsequent filter 16 is so set as to contain not only the desired station band 202 but also a part of the interfering station band 200. Such a bandwidth corresponds to the subsequent filter band 204 of FIG. 2 in the radiofrequency. As described above, if the desired station band 202 has the bandwidth of ±100 kHz from the center thereof, the subsequent filter band 204 will have the bandwidth of ±130 kHz from the center thereof, for example. Hence, the bandwidth of the subsequent filter 16 is narrower than that of the preceding filter 14.

FIGS. 3A and 3B show the effects of the subsequent filter 16. Similar to FIG. 2, the horizontal axis in FIGS. 3A and 3B represents the frequency, whereas the vertical axis represents the electric power. FIG. 3A shows a received signal before it passes through the subsequent filter 16. As shown in FIG. 3A, a desired station band 202 is placed on a low-frequency side, whereas an interfering station band 200 is placed on a high-frequency side. It is assumed here, too, that the received power of interference wave is larger than that of desired wave. FIG. 3B is a received signal after it has passed through the subsequent filter 16. As shown in FIG. 3B, the electric power of interference wave is reduced as compared with that measured before the received signal passes through the subsequent filter 16. A constant modulus algorithm (CMA) is used in the weight derivation unit 30 described later, and control of directing a null toward the interference wave is performed, thus causing a part of the component of interference wave to remain in the subsequent filter 16. Now, refer back to FIG. 1. The subsequent filter 16 outputs the band-limited received signal (hereinafter this signal will also be referred to as "received signal") to the first combining unit 18.

The weight derivation unit 30 receives the received signal fed from each subsequent filter 16, and also receives an array-synthesis result fed from the control unit 24 described later (hereinafter referred to as "first array-synthesis result"). The weight derivation unit 30 derives a weight vector based on the received signal so that the first array-synthesis result can be brought closer to a constant envelope magnitude by CMA. In so doing, an adaptive algorithm such as LMS (Least Mean Square) algorithm or RLS (Recursive Least Square) algorithm is used. Note that known techniques may be used as CMA, LMS algorithm and RLS algorithm and therefore the description thereof is omitted here. As a result of the above-described processing, the weight derivation unit 30 derives a weight vector having components corresponding to the received signal from the subsequent filter 16a and the received signal from the second subsequent filter 16b. The weight derivation unit 30 outputs the thus derived weight vector to the multiplier 32 and the multiplier 36.

The multiplier 32 multiplies the received signal fed from the subsequent filter 16 by the weight vector fed from the weight derivation unit 30, and the adder 34 sums up the multiplication results obtained in the multiplier 32. The summed-up result corresponds to the above-described first array-synthesis result. In other words, the multiplier 32 and the adder 34 perform array synthesis on the received signals fed from the subsequent filter 16, using the weight vector. The adder 34 outputs the first array-synthesis result to the weight derivation unit 30.

The multiplier 36 multiplies the received signal fed from the preceding filter 14 by the weight vector fed from the weight derivation unit 30, and the adder 38 sums up the multiplication results obtained in the multiplier 36. The summed-up result is herein below called a second array-synthesis result. In other words, the multiplier 36 and the adder 38 perform array synthesis on the received signals fed from the preceding filter 14, using the weight vector. The adder 38 outputs the second array-synthesis result to the demodulator 22. The demodulator 22 receives the second array-synthesis result from the adder 38 and performs analog FM demodulation on the second array-synthesis result. A known technique may be used for the analog FM demodulation and therefore the description thereof is omitted here. The result of analog FM demodulation corresponds to audio signals, for instance. The control unit 24 controls the timing of the receiving apparatus 100 as a whole.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

A description is now given of a modification of the exemplary embodiment. Similar to the exemplary embodiment, this modification has a configuration of adaptive array antenna and relates to a receiving apparatus that receives analog FM signals. Similar to the exemplary embodiment, the receiving apparatus according to the modification derives a weight vector based on the received signal that has been band-limited by the subsequent filter, and performs array synthesis on the received signal that is not band-limited by the subsequent filter. On the other hand, the bandwidth of the subsequent filter is set to a fixed value in the exemplary embodiment. However, in the modification, the bandwidth of the subsequent filter is adaptively adjusted.

The bandwidth of the subsequent filter must be so set as to contain not only the desired wave but also a part of the interference wave. If the effect of the interference wave is too small, the constant envelope properties will be maintained. Thus, a null is not directed toward the interference wave. If, on the other hand, the effect of the interference wave is too large, the main lobe is directed toward the interference wave. Accordingly, the effect of the interference wave must be included in the bandwidth of the subsequent filter to the degree that a weight vector by which to direct a null toward the interference wave is derived. For this reason, the receiving apparatus measures the received power of the interference wave and adjusts the bandwidth of the subsequent filter according to the level of the received power.

Figure 4:
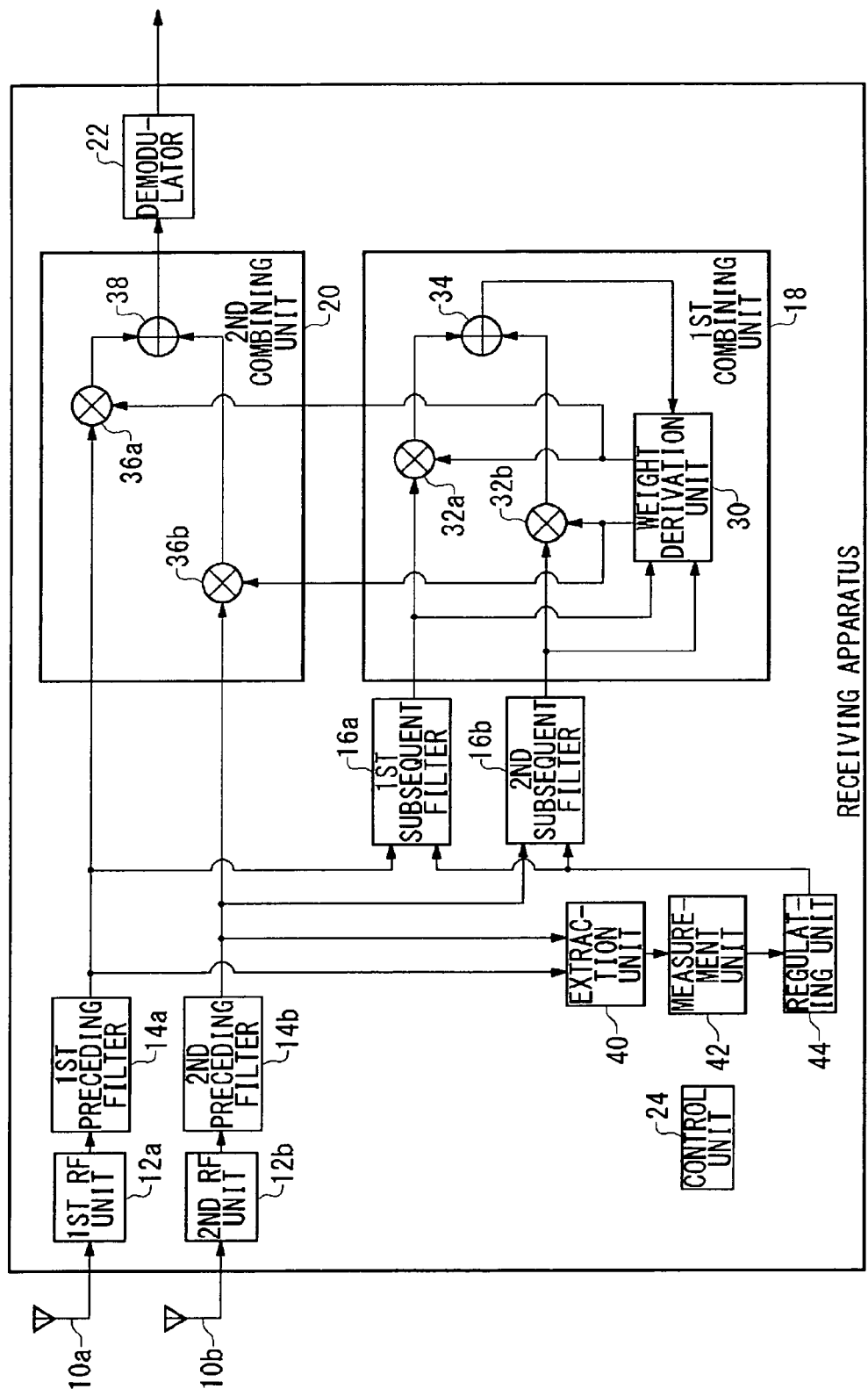
FIG. 4 shows a structure of a receiving apparatus according to a modification of the exemplary embodiment.

FIG. 4 shows a structure of a receiving apparatus 100 according to a modification of the exemplary embodiment. Compared with the receiving apparatus 100 shown in FIG. 1, the receiving apparatus 100 further includes an extraction unit 40, a measurement unit 42, and a regulating unit 44. A description is given hereunder centering around features different from those of the receiving apparatus 100 shown in FIG. 1. The extraction unit 40 receives a received signal fed from the preceding filter 14. The extraction unit 40 is a filter used to extract a component in the band of interfering wave, which is closer to the band of desired wave, from the received signal. The band extracted by the extraction unit 40 corresponds to an adjacent band for the desired band of the second array-synthesis result. The bandwidth for the extraction unit 40 is set to a fixed value. The extraction unit 40 outputs the extracted component to the measurement unit 42.

Figure 5:
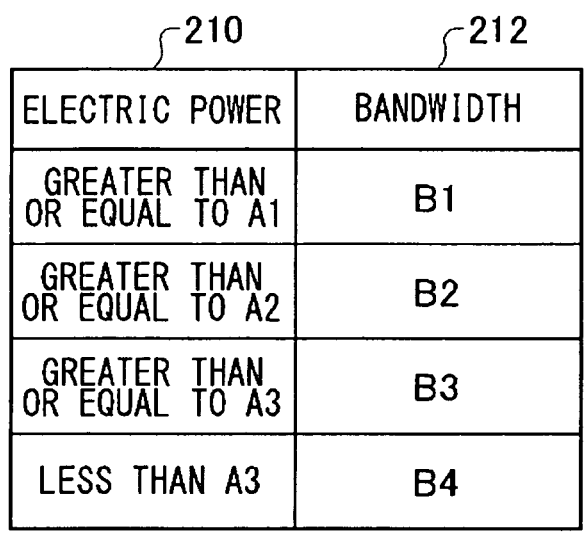
FIG. 5 shows a data structure of a table stored in a regulating unit of FIG. 4.

The measurement unit 42 receives the component extracted by the extraction unit 40. The measurement unit 42 measures the power of the received components, namely the interference power. A publicly known technique may be used for the measurement of interference power and therefore the description thereof is omitted here. The measurement unit 42 outputs the measurement result of interference power to the regulating unit 44. The regulating unit 44 stores a table indicating the correspondence between the interference power and the bandwidth of the subsequent filter 16. FIG. 5 shows a data structure of a table stored in the regulating unit 44. As shown in FIG. 5, the table contains a power column 210 and a bandwidth column 212. The power column indicates threshold values to be compared against the interference power. It is assumed herein that A1>A2>A3. The regulating unit 44 compares the interference power against each threshold, in descending order starting from the top of the power column 210. If the condition is met, the regulating unit 44 will extract a bandwidth corresponding to the condition, from the bandwidth column 212. The bandwidth is defined such that B1<B2<B3<B4. In other words, the power and the bandwidth are set such that the larger the interference power is, the narrower the bandwidth of the subsequent filter 16 will be. Now refer back to FIG. 4. The regulating unit 44 sets the determined bandwidth in the subsequent filter 16. That is, the regulating unit 44 adjusts the bandwidth in the subsequent filter 16 according to the interference power measured by the measurement unit 42.

Another modification of the exemplary embodiment relates to a receiving apparatus that receives analog signals broadcast from FM broadcast stations. Each FM broadcast station is assigned a channel having a bandwidth of 200 kHz. The receiving apparatus receives an analog FM signal placed in a channel by tuning in this desired channel. To enhance the receiving quality, the receiving apparatus has a configuration of adaptive array antenna. If the received power of analog FM signal coming from an interfering station (hereinafter such a signal will be referred to as "interference wave") is larger than that of analog FM signal coming from a desired station (hereinafter such a signal will be referred to as "desired wave"), the main lobe may sometimes be directed toward the interference wave. As the radio wave environment varies with time, the weight vector also varies. It is desired that the receiving condition be stabilized following the change in propagation environment. To cope with this, the receiving apparatus according to the another modification performs the following processing. Assume herein below for ease of explanation that the interference wave is placed in an adjacent channel of desired wave. As described above, in order to suppress the degradation of quality of reproduced audio, the receiving apparatus is not allowed to perform adaptive array control after the desired waves only have been extracted through a filter.

The receiving apparatus according to the another modification separates a received baseband signal into two signals. One of the received signals that have been separated is band-limited by the filter. Here the filter has a passband width that allows to pass not only desired wave but also a part of interference wave. If a received signal that has been band-limited in this manner is demodulated, the sound quality will generally deteriorate as described above. The receiving apparatus derives a weight vector based on the received signal that has been band-limited, and band-limited received signal is subjected to array synthesis using the thus derived weight vector. Also, the receiving apparatus delays the other received signal, namely the received signal that is not band-limited, for a period of time longer than that for the derivation of the weight vector. As a result, for the received signal that is not band-limited, the weight vector corresponds to a future radio wave environment. Further, the receiving apparatus performs array synthesis on the delayed received signals by adjusting the output timing of the weight vector. The latter array-synthesis result is demodulated.

Figure 6:
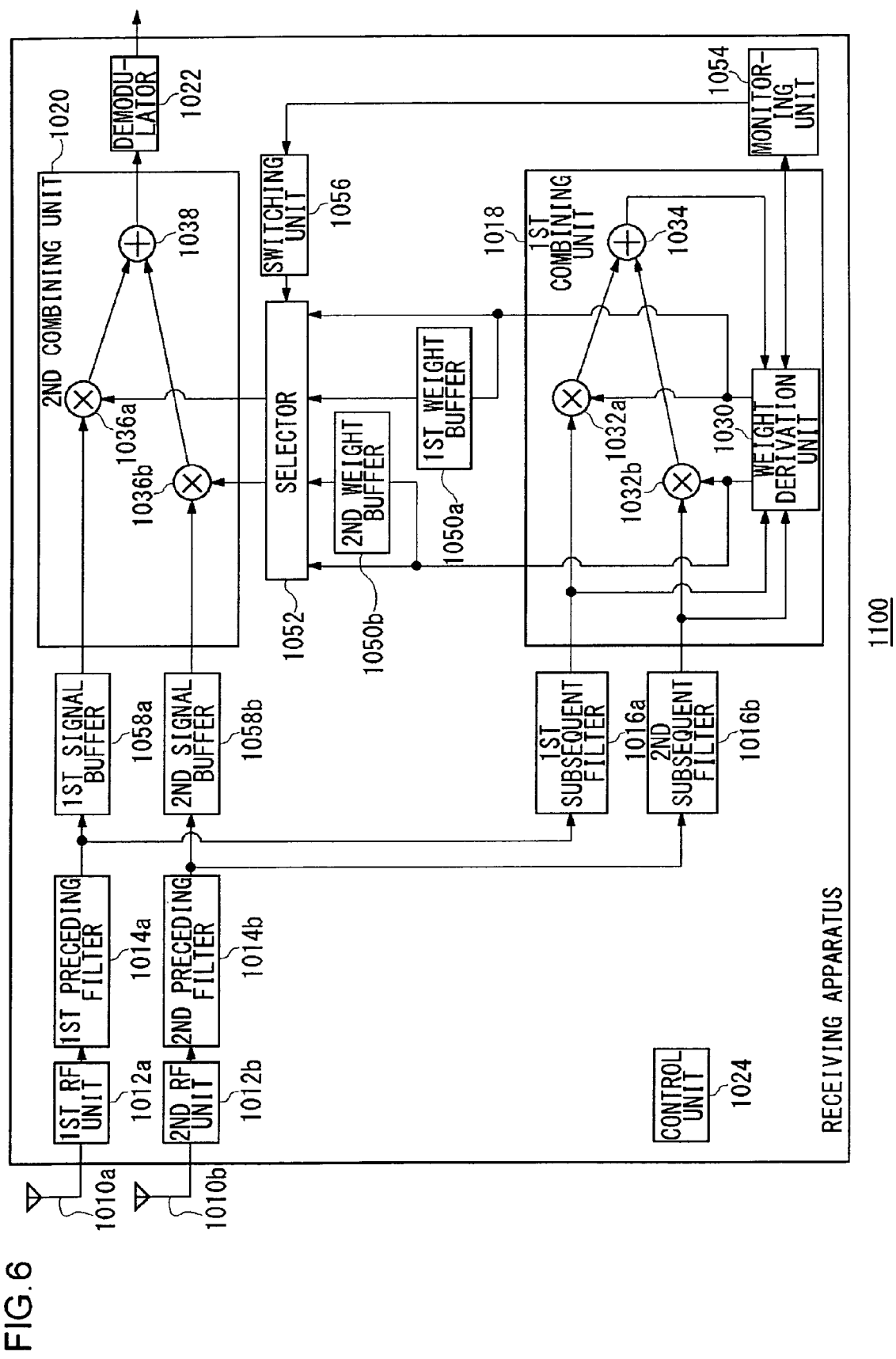
FIG. 6 shows a structure of a receiving apparatus according to another modification of the exemplary embodiment.

FIG. 6 shows a structure of a receiving apparatus 1100 according to the another modification of the exemplary embodiment. The receiving apparatus 1100 includes a first antenna 1010a and a second antenna 1010b, which are generically referred to as "antenna 1010" or "antennas 1010", a first RF unit 1012a and a second RF unit 1012b, which are generically referred to as "RF unit 1012" or "RF units 1012", a first preceding filter 1014a and a second preceding filter 1014b, which are generically referred to as "preceding filter 1014" or "preceding filters 1014", a first subsequent filter 1016a and a second subsequent filter 1016b, which are generically referred to as "subsequent filter 1016" or "subsequent filters 1016", a first combining unit 1018, a second combining unit 1020, a demodulator 1022, a control unit 1024, a first weight buffer 1050a and a second weight buffer 1050b, which are generically referred to as "weight buffer 1050" or "weight buffers 1050", a selector 1052, a monitoring unit 1054, a switching unit 1056, and a first signal buffer 1058a and a second signal buffer 1058b, which are generically referred to as "signal buffer 1058" or "signal buffers 1058". The first combining unit 1018 includes a weight derivation unit 1030, a first multiplier 1032a and a second multiplier 1032b, which are generically referred to as "multiplier 1032" or "multipliers 1032", and an adder 1034. The second combining unit 1020 includes a first multiplier 1036a and a second multiplier 1036b, which are generically referred to as "multiplier 1036" or "multipliers 1036", and an adder 1038.

Figure 7:
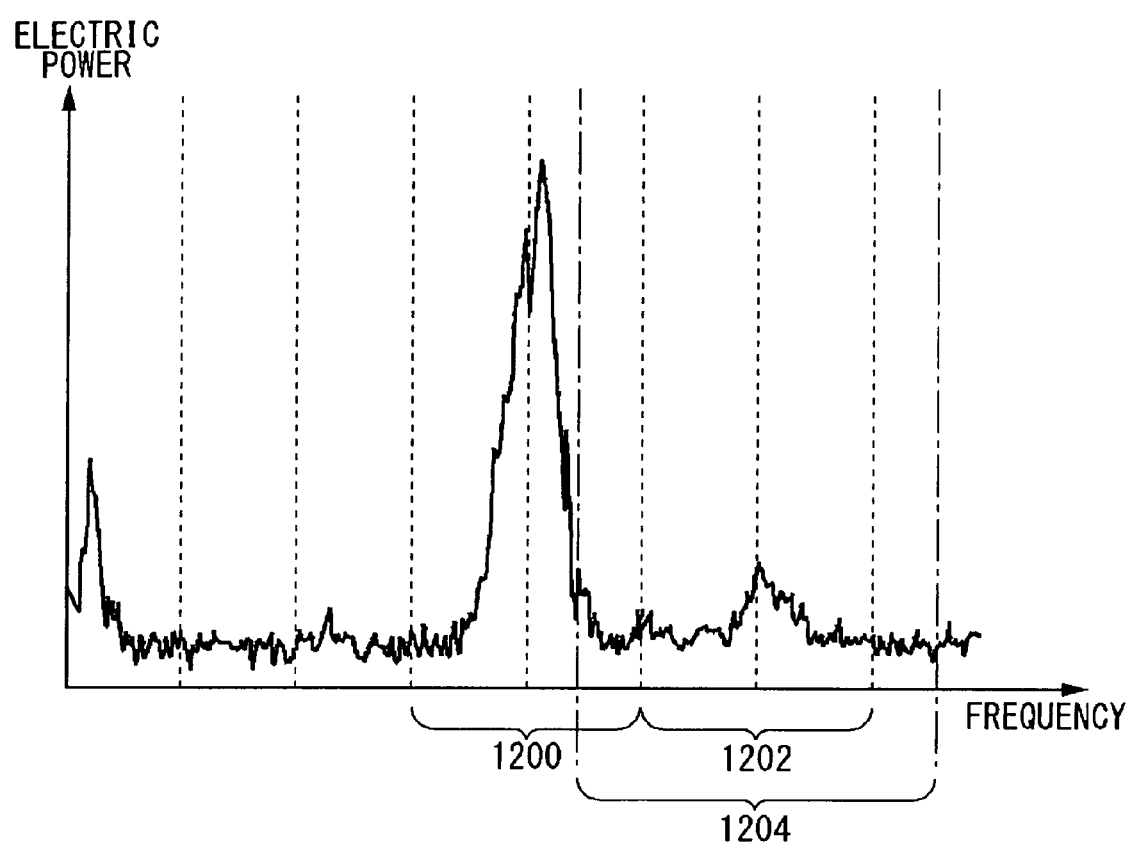
FIG. 7 shows the spectrum of a signal received by the receiving apparatus of FIG. 6.

Each of a plurality of antennas 1010 receives a signal broadcast from a not-shown FM broadcast station. The signals received by the antennas 1010 include desired wave and interference wave. FIG. 7 shows an example of the spectrum of a signal received by the receiving apparatus 1100. The horizontal axis in FIG. 7 represents the frequency, whereas the vertical axis represents the electric power. A desired station band 1202 corresponds to the band assigned to a desired station. As described above, the desired station band 1202 occupies the bandwidth of ±100 kHz from the center thereof and therefore occupies the bandwidth of 200 kHz. An interfering station band 1200 is placed adjacent to the desired station band 1202. The interfering station band 1200 corresponds to the band assigned to the interfering station and occupies the same bandwidth as the interfering band 1200. As shown in FIG. 7, assumed herein is a case where the received power of interference wave is larger than that of desired wave. In such a case, as described above, the main lobe is directed toward the interference wave if the adaptive array processing is carried out. A subsequent filter band 1204 will be discussed later. Now refer back to FIG. 6.

The RF units 1012 are arranged in one-to-one correspondence to a plurality of antennas 1010. The RF unit 1012 receives a signal received by the antenna 1010 (hereinafter referred to as "received signal"). Here, the received signal is a radiofrequency signal. The RF unit 1012 carries out frequency conversion of received radiofrequency signal so as to generate a baseband received signal (hereinafter referred to as "received signal"). The baseband signal, which is composed of in-phase components and quadrature components, shall generally be indicated by two signal lines. For the clarity of figure, however, the baseband signal is presented here by a single signal line only. Also, the RF unit 1012 includes a low noise amplifier (LNA), a mixer, and an A-D converter. Further, the RF unit 1012 outputs the received signal to the preceding filter 1014.

The preceding filters 1014 are arranged in one-to-one correspondence to the RF units 1012, and the preceding filters 1014 receive the received signals fed from the RF units 1012. The preceding filter 1014 band-limits the received signal. For example, the preceding filter 1014 is constituted by a low-pass filter. Here, the preceding filter 1014 is provided for the purpose of reducing a harmonic component contained in the received signal. Thus, the preceding filter 1014 has a bandwidth covering the desired station band 1202 and the interfering station band 1200 of FIG. 7. The preceding filter 1014 outputs the band-limited received signal (hereinafter this signal will also be referred to as "received signal") to the signal buffer 1058 and the subsequent filter 1016.

The signal buffers 1058 are arranged in one-to-one correspondence to the preceding filters 1014, and the signal buffers 1058 receive the received signals fed from the preceding filters 1014. The signal buffer 1058 delays the received signal for a predetermined time period. The signal buffer 1058 outputs the thus delayed received signal to the second combining unit 1020. The period of time during which the signal buffer 1058 delays the received signal is set longer than the processing time period in the subsequent filters 1016 and the first combining unit 1018. As a result, the processing in the first combining unit 1018 corresponds to the processing, performed on the received signal outputted from the signal buffer 1058, for a radio wave environment in the relative future time.

The subsequent filters 1016 are arranged corresponding to the preceding filters 1014, respectively, and the subsequent filters 1016 receive the received signals fed from the preceding filters 1014. Similar to the preceding filter 1014, the subsequent filter 1016 band-limits the received signal. Similar to the preceding filter 1014, the subsequent filter 1016 is constituted by a low-pass filter. However, the bandwidth of the subsequent filter 1016 differs from that of the preceding filter 1014. The bandwidth of the subsequent filter 1016 is so set as to contain not only the desired station band 1202 but also a part of the interfering station band 1200. Such a bandwidth corresponds to the subsequent filter band 1204 of FIG. 7 in the radiofrequency. As described above, if the desired station band 1202 has the bandwidth of ±100 kHz from the center thereof, the subsequent filter band 1204 will have the bandwidth of ±130 kHz from the center thereof, for example. Hence, the bandwidth of the subsequent filter 1016 is narrower than that of the preceding filter 1014.

Figure 8:
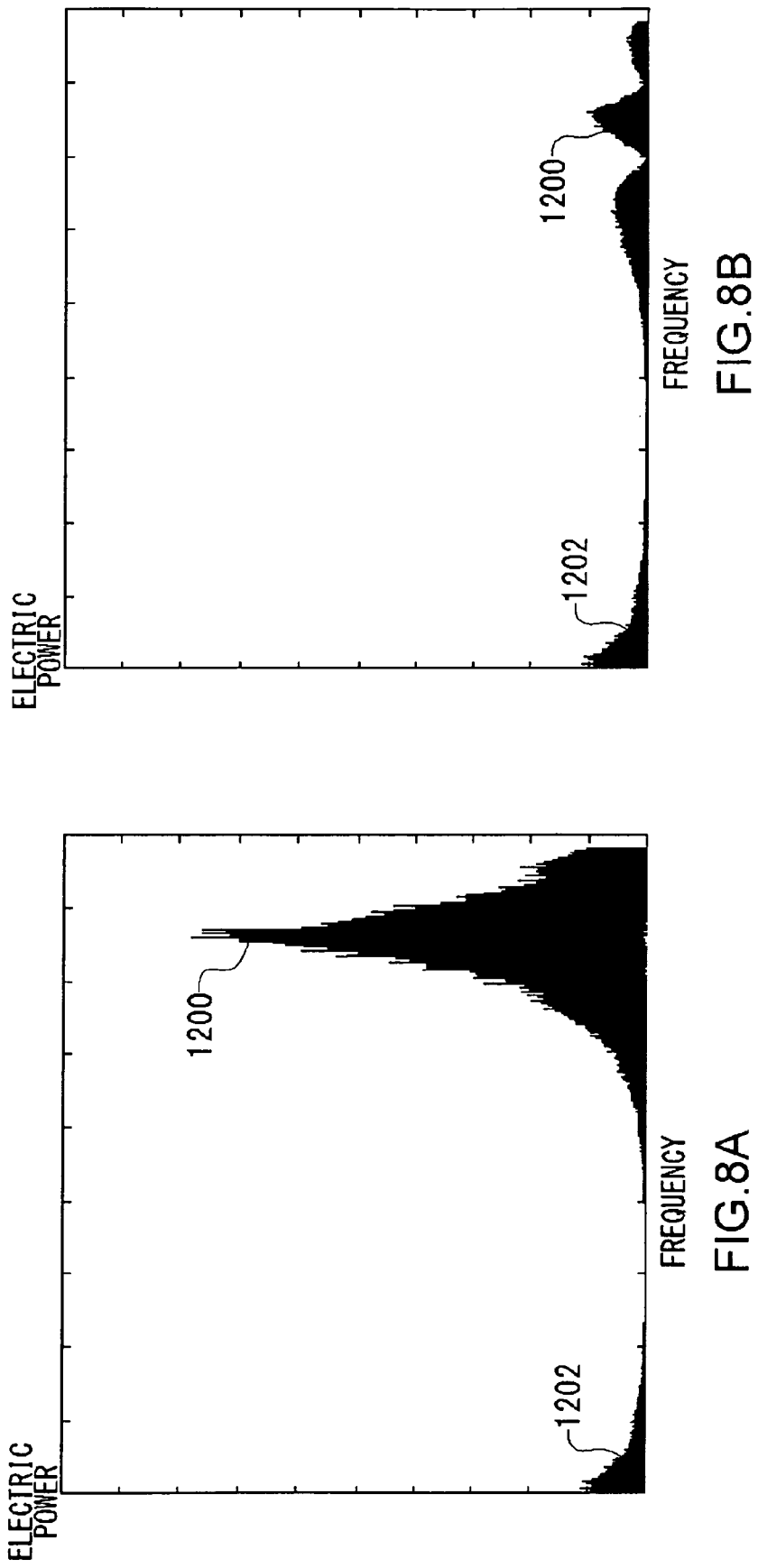
FIGS. 8A and 8B show the effects of a subsequent filter shown in FIG. 6.

FIGS. 8A and 8B show the effects of the subsequent filter 1016. Similar to FIG. 7, the horizontal axis in FIGS. 8A and 8B represents the frequency, whereas the vertical axis represents the electric power. FIG. 8A shows a received signal before it passes through the subsequent filter 1016. As shown in FIG. 8A, a desired station band 1202 is placed on a low-frequency side, whereas an interfering station band 1200 is placed on a high-frequency side. It is assumed here, too, that the received power of interference wave is larger than that of desired wave. FIG. 8B is a received signal after it has passed through the subsequent filter 1016. As shown in FIG. 8B, the electric power of interference wave is reduced as compared with that measured before the received signal passes through the subsequent filter 1016. A constant modulus algorithm (CMA) is used in the weight derivation unit 1030 described later, and control of directing a null toward the interference wave is performed, thus causing a part of the component of interference wave to remain in the subsequent filter 1016. Now, refer back to FIG. 6. The subsequent filter 1016 outputs the band-limited received signal (hereinafter this signal will also be referred to as "received signal") to the first combining unit 1018.

The weight derivation unit 1030 receives the received signal fed from each subsequent filter 1016, and also receives an array-synthesis result fed from the control unit 1024 described later (hereinafter referred to as "first array-synthesis result"). The weight derivation unit 1030 derives a weight vector based on the received signal so that the first array-synthesis result can be brought closer to a constant envelope magnitude by CMA. In so doing, an adaptive algorithm such as LMS (Least Mean Square) algorithm or RLS (Recursive Least Square) algorithm is used. Note that known techniques may be used as CMA, LMS algorithm and RLS algorithm and therefore the description thereof is omitted here. As a result of the above-described processing, the weight derivation unit 1030 derives a weight vector having components corresponding to the received signal from the subsequent filter 1016a and the received signal from the second subsequent filter 1016b. The weight derivation unit 1030 outputs the thus derived weight vector to the multiplier 1032. The weight derivation unit 1030 also outputs the thus derived weight vector to the weight buffers 1050 and the selector 1052.

The multiplier 1032 multiplies the received signal fed from the subsequent filter 1016 by the weight vector fed from the weight derivation unit 1030, and the adder 1034 sums up the multiplication results obtained in the multiplier 1032. The summed-up result corresponds to the above-described first array-synthesis result. In other words, the multiplier 1032 and the adder 1034 perform array synthesis on the received signals fed from the subsequent filter 1016, using the weight vector. The adder 1034 outputs the first array-synthesis result to the weight derivation unit 1030.

The weight buffers 1050 are arranged corresponding to each component of the weight vector, and the weight buffers 1050 receive the weight vector derived by the weight derivation unit 1030. The weight buffer 1050 delays the weight vector for a predetermined time period. The weight buffer 1050 outputs the thus delayed weight vector to the selector 1052. The period of time during which the weight buffer 1050 delays the weight vector is set shorter than the period of time during which the signal buffer 1058 delays the received signal. This is to prevent the weight vector from becoming a weight vector of a relative past time for the received signal.

The selector 1052 receives a weight vector fed from the weight buffer 1050 (hereinafter referred to as "first weight vector") and also receives a weight vector fed from the weight derivation unit 1030 (hereinafter referred to as "second weight vector"). The selector 1052 receives a selection instruction given from the switching unit 1056 and selects either the first weight vector or the second weight vector according to the selection instruction. The selector 1052 outputs the selected weight vector to the multiplier 1036.

The monitoring unit 1054 monitors the convergence degree of the weight vector. More specifically describing this, the monitoring unit 1054 receives error between the first array-synthesis result and a desired envelope magnitude, from the weight derivation unit 1030 so as to monitor the level of error. Note that the monitoring unit 1054 may receive the first array-synthesis result from the adder 1034 and calculate error by storing the desired envelope magnitude. Also, the monitoring unit 1054 may monitor the change in the magnitude of at least one of the amplitude of the weight vector, the phase of the weight vector, the amplitude of the input signal and the phase of the input signal. The monitoring unit 1054 outputs the error, which is being monitored, to the switching unit 1056.

The switching unit 1056 controls the selection made by the selector 1052 (described later), based on the convergence degree of the weight vector that is being monitored by the monitoring unit 1054. More specifically describing this, the switching unit 1056 receives the error from the monitoring unit 1054. Also, the switching unit 1056 sets beforehand a threshold value for the error (hereinafter referred to as "error-amount-level threshold value"). If the error becomes less than the error-amount-level threshold value, the switching unit 1056 will generate a selection instruction with which to have the selector 1052 select the second weight vector. If otherwise, it will generate a selection instruction with which to have the selector 1052 select the first weight vector. Here, selecting the first weight vector corresponds to enabling the weight buffer 1050, whereas selecting the second weight vector corresponds to disabling the weight buffer 1050.

Note that the switching unit 1056 may calculate a variation range of error over a predetermined period of time and may compare the thus calculated variation range against a threshold value for the variation range (hereinafter referred to as "variation-range threshold value"). In such a case, if the variation range becomes less than the variation-range threshold value, the switching unit 1056 will generate a selection instruction with which to select the second weight vector. If otherwise, it will generate a selection instruction with which to select the first weight vector. Further, the switching unit 1056 may generate a selection instruction using both the error-amount-level threshold value and the variation-range threshold value. In such a case, if the error and the variation range become less than their threshold values, the switching unit 1056 may generate a selection instruction with which to select the second weight vector. Or, if the error or variation range becomes less than its threshold value, the switching unit 1056 may generate a selection instruction with which to select the second weight vector. Further, after a predetermined period of time has elapsed after having the selector 1052 selects the second weight vector, the switching unit 1056 generates a selection instruction with which to have the selector 1052 select the first weight vector. The switching unit 1056 outputs the generated selection instruction to the selector 1052.

The above-described processing will now be described in more detail. In the initial state of the receiving, both the signal buffer 1058 and the weight buffer 1050 are in the enabled state and, and the adaptive array control is being performed. Accordingly, the received signal outputted from the signal buffer 1058 lags the weight vector outputted from the selector 1052 in timing. In such a case, the selector selects the first weight vector. As a result, the first combining unit 1018 derives a weight vector for a received signal that relatively leads a received signal outputted from the signal buffer 1058. When viewed in terms of the received signal outputted from the signal buffer 1058, this is equivalent to that the first combining unit 1018 performs arithmetic processing on a future received signal.

At the timing when the error becomes less than the error-amount-level threshold value, the switching unit 1056 determines that the weight vector has reached targeted values. The switching unit 1056 determines the switching from the first weight vector to the second weight vector. With a selection instruction given in response to this switching, the selector 1052 switches the selection of a weight vector from the first weight vector to the second weight vector. This is equivalent to that the weight buffer 1050 switches the state from the enabled state to the disabled state. As a result, the second weight vector derived by the weight derivation unit 1030 is instantaneously supplied to the second combining unit 1020 with a small delay. In the second combining unit 1020, the time period required for the derivation of the weight vector will be reduced and therefore an array-synthesis result using an optimum weight vector is instantaneously outputted.

Figure 9:
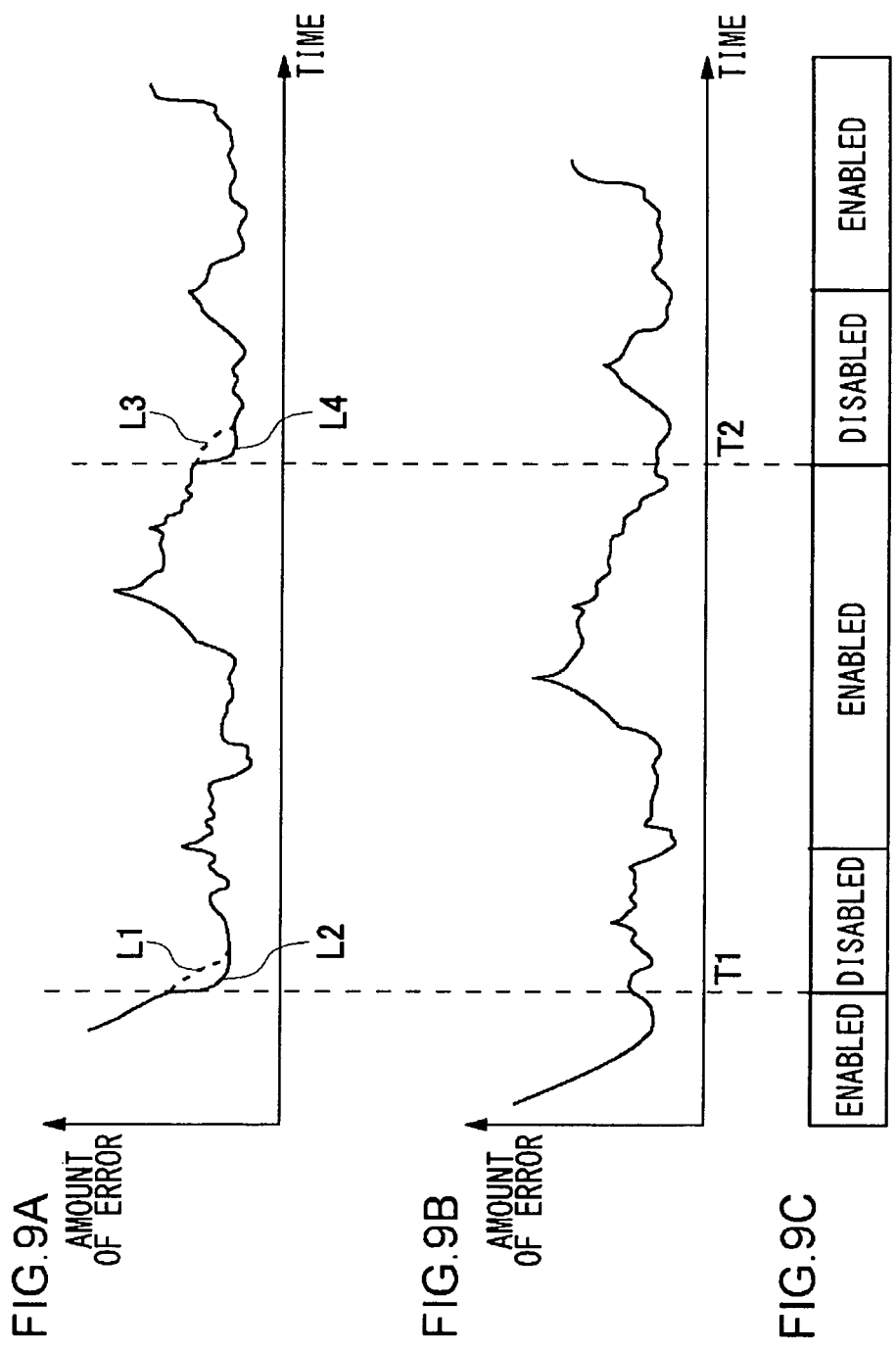
FIGS. 9A to 9C show operational overviews of a switching unit shown in FIG. 6.

If the error does not stabilize due to a large variation in the received signal, the switching unit 1056 continues to select the first weight vector. This is equivalent to continuing to enable the weight buffer 1050. If, on the other hand, the error becomes greater than or equal to the error-amount-level threshold value due to abrupt variations in the propagation environment after the switching is made to the second weight vector, the switching unit 1056 will switch the weight vector to the first weight vector. In this manner, the selector 1052 is switched depending on the condition of propagation environment, namely the condition of error. FIGS. 9A to 9C show operational overviews of the switching unit 1056. FIG. 9A shows an amount of error for the weight vector selected by the selector 1052, whereas FIG. 9B shows an amount of error for the weight vector derived by the weight derivation unit 1030. In FIG. 9A and FIG. 9B, the horizontal axis represents time and the vertical axis represents the error amount.

FIG. 9C shows a content of the selection instruction given from the switching unit 1056. Here, "enabled" indicates the selection of the first weight vector, and "disabled" indicates the selection of the second weight vector. In FIG. 9B, at the timing T1 when the error and the variation range become less than their threshold values, the switching unit 1056 determines the switching to the second weight vector from the first weight vector. Suppose that the first weight vector continues to be selected. Then the amount of error will be the dotted line "L1" of FIG. 9A. On the other hand, if the switching is made to the second weight vector, the amount of error shown in FIG. 9A will be the solid line "L2". Hence, the switching of the weight vector results in a reduction of the amount of error. This is equivalent to the fact that the convergence speed becomes faster. After a predetermined period of time has elapsed after the switching, the switching unit 1056 switches the weight vector from the second weight vector to the first weight vector in preparation for the next variation in the propagation environment. At the timing T2, the similar operation to the timing T1 is executed. Now refer back to FIG. 6.

The multiplier 1036 multiplies the received signal fed from the signal buffer 1058 by the weight vector fed from the weight derivation unit 1030, and the adder 1038 sums up the multiplication results obtained in the multiplier 1036. The summed-up result is herein below called a second array-synthesis result. In other words, the multiplier 1036 and the adder 1038 perform array synthesis on the received signals fed from the signal buffer 1058, using the weight vector. The adder 1038 outputs the second array-synthesis result to the demodulator 1022. The demodulator 1022 receives the second array-synthesis result from the adder 1038 and performs analog FM demodulation on the second array-synthesis result. A known technique may be used for the analog FM demodulation and therefore the description thereof is omitted here. The result of analog FM demodulation corresponds to audio signals, for instance. The control unit 1024 controls the timing of the receiving apparatus 1100 as a whole.

This structure may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 10:
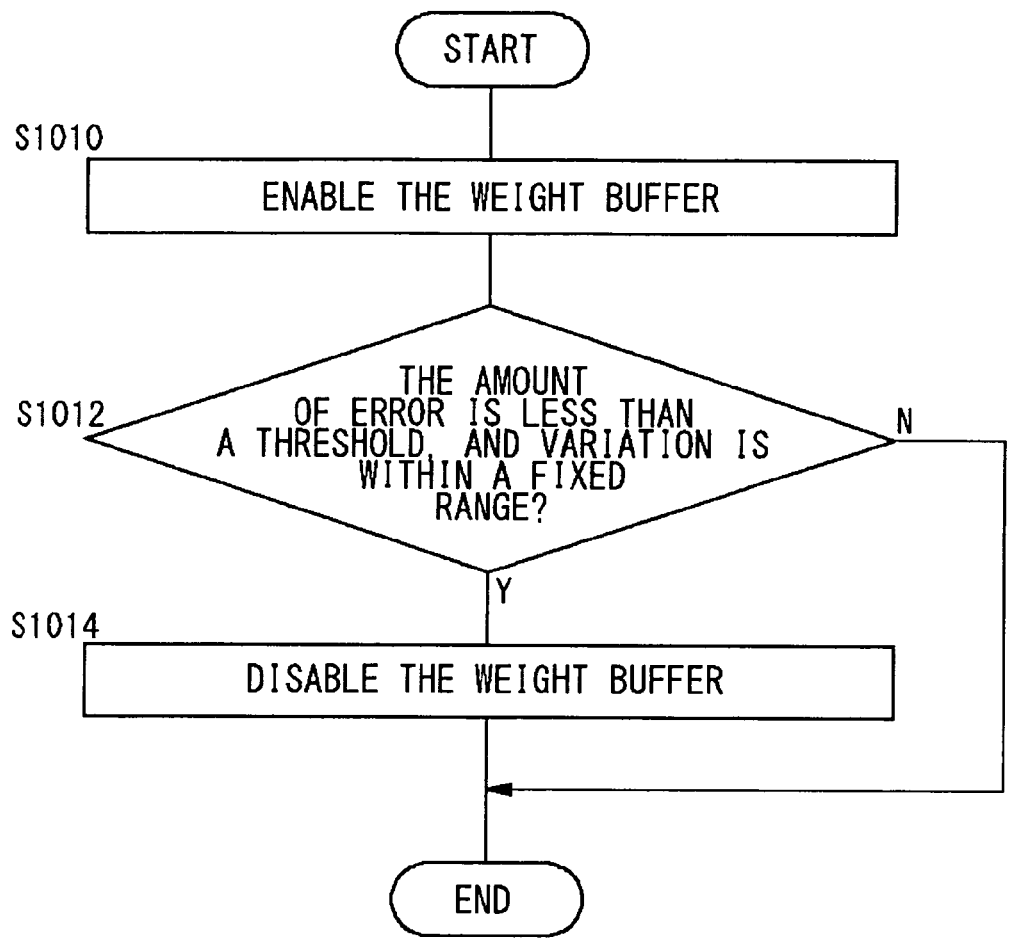
FIG. 10 is a flowchart showing a switching procedure performed by the receiving apparatus of FIG. 6.

An operation of the receiving apparatus 1100 structured as above will now be described. FIG. 10 is a flowchart showing a switching procedure performed by the receiving apparatus 1100. The switching unit 1056 enables the weight buffer 1050 (S1010). If the amount of error is less than a threshold value and the variation is within a fixed range (Y of S1012), the switching unit 1056 will disable the weight buffer 1050 (S1014). If, on the other hand, the amount of error is not less than the threshold value or the variation is not within the fixed range (N of S1012), Step S1014 will be skipped.

Figure 11:
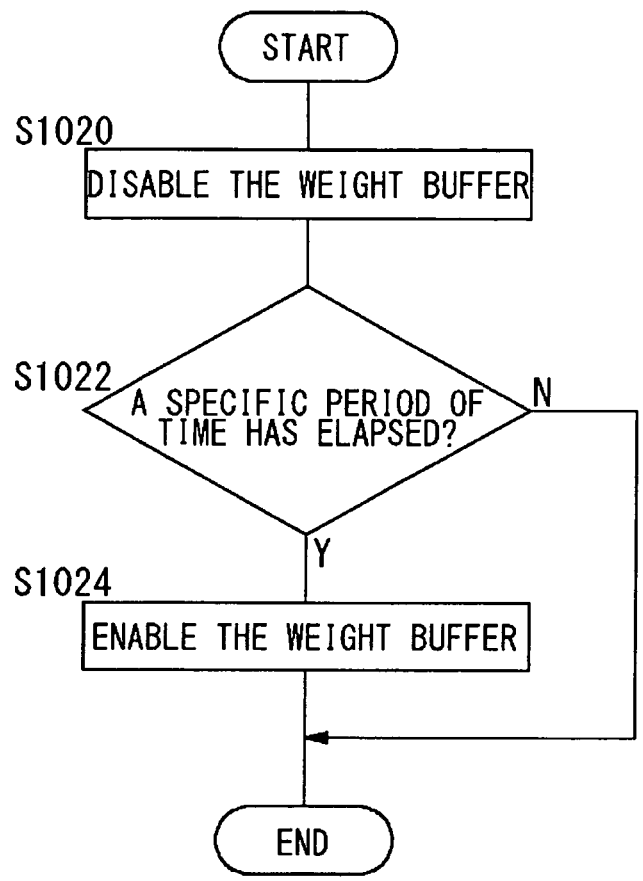
FIG. 11 is a flowchart showing another switching procedure performed by the receiving apparatus of FIG. 6.

FIG. 11 is a flowchart showing another switching procedure performed by the receiving apparatus 1100. The switching unit 1056 disables the weight buffer 1050 (S1020). If a specific period of time has elapsed (Y of S1022), the switching unit 1056 enables the weight buffer 1050 (S1024). If, on the other hand, the specific period of time has not elapsed yet (N of S1022), Step S1024 is skipped.

Figure 12:
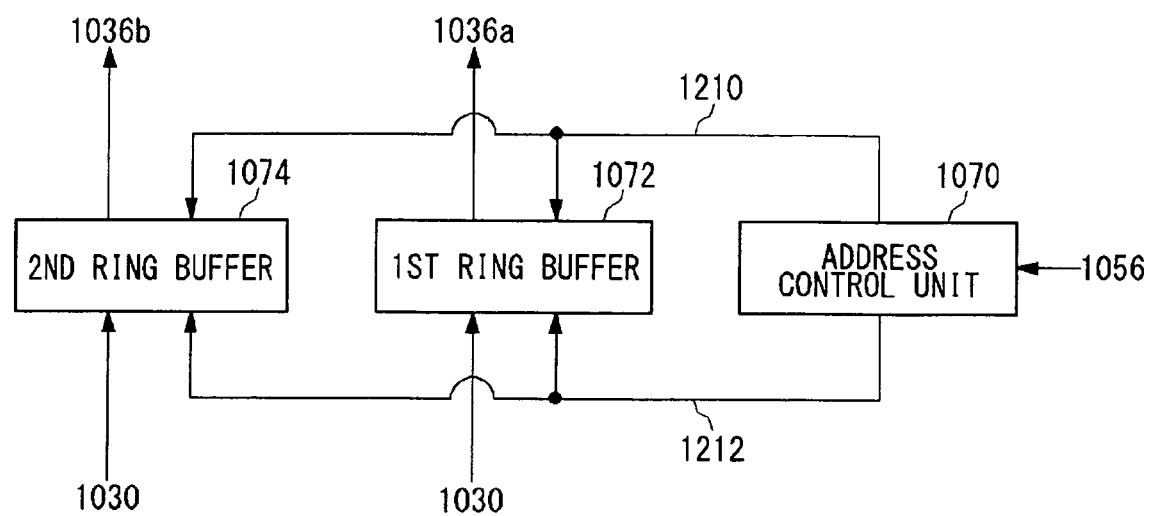
FIG. 12 shows a structure to perform another switching control in the receiving apparatus of FIG. 6.

FIG. 12 shows a structure to realize another switching control in the receiving apparatus 1100. As shown in FIG. 12, this switching control unit includes an address control unit 1070, a first ring buffer 1072, and a second ring buffer 1074. This switching control unit is provided in the place of the first weight buffer 1050$a$, the second weight buffer 1050$b$ and the selector 1052 shown in FIG. 6. Provision of this switching control unit realizes another type of control that is different from the method in which one of two modes is selectable (two-mode selectable method). The first ring buffer 1072 and the second ring buffer 1074 are each dual-port memory. The first ring buffer 1072 is connected to a terminal of the weight derivation unit 1030 on a first multiplier 1032$a$ side and the first multiplier 1036$a$. The second ring buffer 1074 is connected to a terminal of the weight derivation unit 1030 on a second multiplier 1032$b$ side and the second multiplier 1036$b$. The address control unit 1070 receives a selection instruction fed from the not-shown switching unit 1056. Also, using the first ring buffer 1072 and the second ring buffer 1074, the address control unit 1070 performs a control to vary the relative distance between an address used to write data of weight vector and an address used to read data of weight vector. In FIG. 12, the address used to write the data of weight vector is indicated by a write address 1212, whereas the address used to read the data of weight vector is indicated by a read address 1210. By performing the control as described above, an increased delay variation more than in the two-mode selectable method can be realized.

By employing the address access method using the dual-port memory, not only two address values with and without the amount of delay (two-mode selection) but also address values corresponding to a middle offset are generated in stages. With such additional address values as described above, a weight vector corresponding to the stepwise amounts of delay is supplied from the dual-port memory and shared with multiplier 1036. As a result, abrupt variations in signals can be suppressed and therefore the quality of reproduced signals outputted from the demodulator 1022 are improved.

A description is next given of still another modification of the exemplary embodiment. Similar to the another modification, the still another modification relates also to a receiving apparatus having a configuration of adaptive array antenna. Also, similar to the another modification, the receiving apparatus according to the still another modification switches between whether the weight buffer 1050 is to be enabled or whether it is to be disabled, according to the convergence degree of the weight vector. The still another modification differs from the another modification in the structure of received signals. Though analog FM signals are received in the another modification, OFDM signals and analog FM signals are frequency-division multiplexed in the still another modification. More specifically, OFDM signals are assigned on a low-frequency side and a high-frequency side in such a manner that an analog FM signal is held between the OFDM signals.

These signals are broadcast from the same broadcast station. For example, the contents of programs transmitted by analog FM signals are stored in the OFDM signals. Also, additional information may be stored in the OFDM signals. Accordingly, receiving apparatuses, which are capable of receiving analog FM signals only, demodulate the analog FM signals and reproduce audio signals. On the other hand, receiving apparatuses, which are capable of receiving OFDM signals as well, demodulate the OFDM signals and reproduce audio signals. The receiving apparatuses capable of receiving analog FM signals only are structured as shown in FIG. 6 and therefore the description thereof is omitted here.

FIGS. 13A and 13B each shows the spectrum of a signal received by the receiving apparatus according to the still another modification of the exemplary embodiment. The horizontal axis in FIGS. 13A and 13B represents the frequency, whereas the vertical axis represents the electric power. In a system to be discussed herein, a hybrid method is employed where the digital signals are transmitted simultaneously with the analog FM broadcasting, using the existing frequency used in the analog FM broadcasting. More specifically, digital signals are appended to within the band of the existing analog FM signal and also appended to the sidebands on the both sides of the band thereof. In FIG. 13A, an analog FM signal is allocated in a frequency band ranging from a frequency $f_1$ to a frequency $f_2$ with a center frequency fc; a first OFDM signal is allocated to a low-frequency-side sideband, and a second OFDM signal is allocated to a highfrequency-side sideband. The first OFDM signal and the second OFDM signal are hereinafter generically referred to as "OFDM signal". Here, the first OFDM signal is assigned in a frequency band ranging from a frequency $f_L$ to frequency $f_1$, and the second OFDM signal is assigned in a frequency band ranging from the frequency $f_2$ to frequency $f_U$. Each OFDM signal is composed of multiple subcarriers.

Similarly to FIG. 13A, a first OFDM signal, an analog FM signal and a second OFDM signal are assigned in FIG. 13B. In FIG. 13B, a first enhanced signal is further allocated to a high-frequency side of the first OFDM signal, and a second enhanced signal is further allocated to a low-frequency side of the second OFDM signal. The first enhanced signal and the second enhanced signal are assigned to within the analog FM signal, and are each constituted by an OFDM signal similarly to the first OFDM signal. The first enhanced signal is assigned in a frequency band ranging from the frequency $f_1$ to frequency $f_3$, and the second enhanced signal is assigned in a frequency band ranging from a frequency $f_4$ to frequency $f_2$. Note that the first enhanced signal and the second enhanced signal contain information which is not stored in the first and second OFDM signals.

The receiving apparatus 1100 capable of receiving the signals as shown in FIGS. 13A and 13B is of a configuration similar to that described in conjunction with FIG. 6. A description is given hereunder centering around features different from those of the receiving apparatuses previously described. The subsequent filter 1016 band-limits the received signals in such manner as to reduce the respective components of OFDM signals and enhanced signals contained in the received signals. The multiplier 1036 and the adder 1038 performs array synthesis on the received signals comprised of analog FM signals combined with OFDM signals, using a weight vector fed from the selector 1052. The demodulator 1022 demodulates the OFDM signals and enhanced signals in the second array-synthesis result fed from the adder 1038. Note here that the demodulator 1022 may demodulate the analog FM signals.

Still another modification of the exemplary embodiment relates to a receiving apparatus that receives hybrid signals broadcast from the broadcast stations. OFDM signals and analog FM signals are frequency-division multiplexed in the hybrid signal and, more specifically, OFDM signals are assigned on a low-frequency side and a high-frequency side in such a manner that an analog FM signal is held between the OFDM signals. For example, the contents of programs transmitted by analog FM signals are stored in the OFDM signals. Also, additional information may be stored in the OFDM signals. As described above, receiving apparatuses, which are capable of receiving analog FM signals only, demodulate the analog FM signals and reproduce audio signals. On the other hand, receiving apparatuses, which are capable of receiving OFDM signals as well, demodulate the OFDM signals and reproduce audio signals and additional information. To perform adaptive array processing on the hybrid signals containing such different types of signals, the receiving apparatus according to the still another modification performs the following processings.

The receiving apparatus according to the still another modification separates a received baseband signal into two signals. One of the received signals that have been separated is converted into a frequency-domain received signal, and subcarrier components, to which known signals are assigned, in the frequency-domain OFDM signal are extracted. Extracting the subcarrier components to which known signals are assigned is equivalent to inserting zeros to the other subcarrier components. The receiving apparatus converts the received signals to which zeros have been inserted, into the time domain and then derives a weight vector based on those converted into the time domain. The receiving apparatus performs array synthesis on the other received signal, which is the hybrid signal, using the thus derived weight vector. The array-synthesis result is demodulated.

Figure 14:
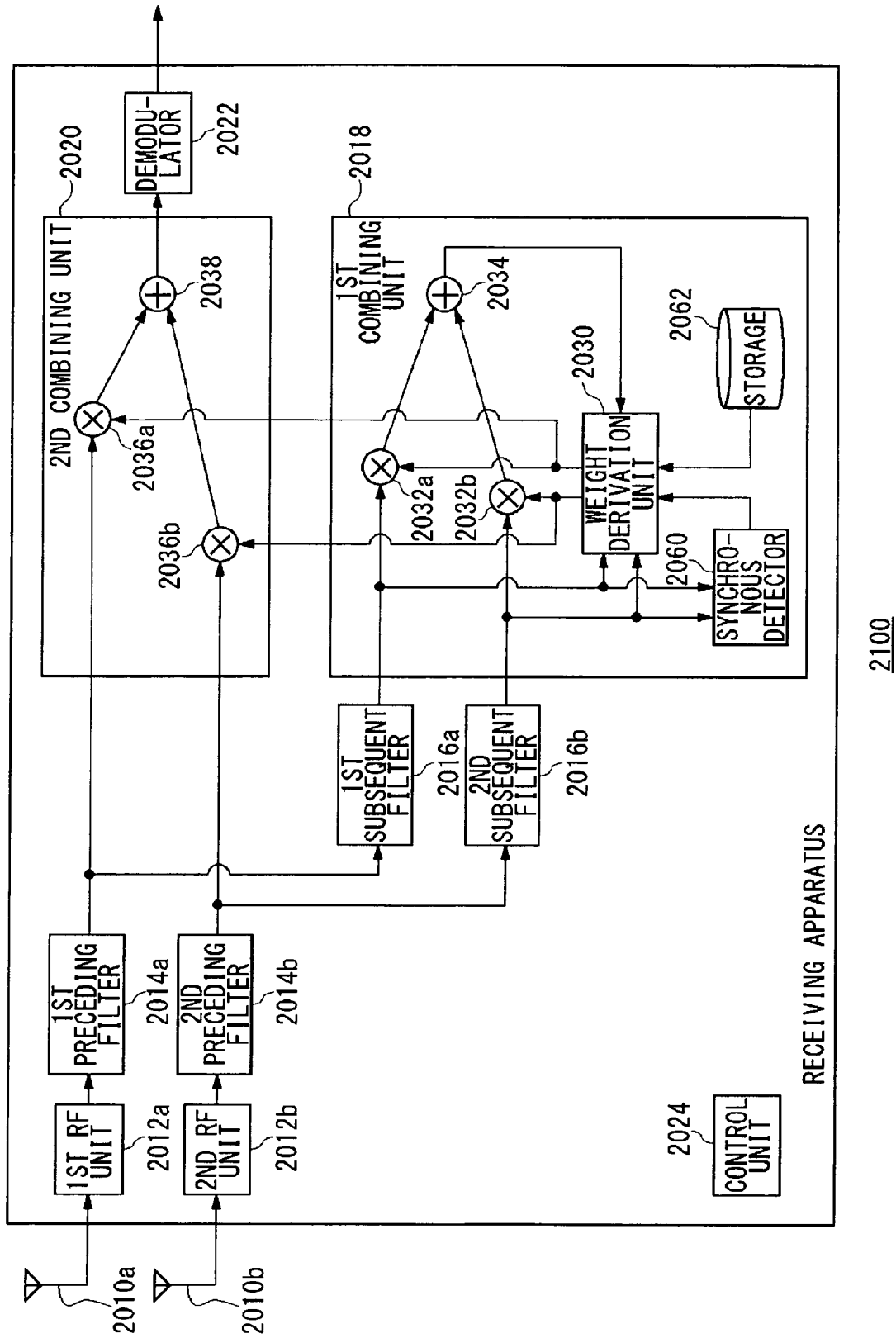
FIG. 14 shows a structure of a receiving apparatus according to still another modification of the exemplary embodiment.

FIG. 14 shows a structure of a receiving apparatus 2100 according to still another modification of the exemplary embodiment. The receiving apparatus 2100 includes a first antenna 2010a and a second antenna 2010b, which are generically referred to as "antenna 2010" or "antennas 2010", a first RF unit 2012a and a second RF unit 2012b, which are generically referred to as "RF unit 2012" or "RF units 2012", a first preceding filter 2014a and a second preceding filter 2014b, which are generically referred to as "preceding filter 2014" or "preceding filters 2014", a first subsequent filter 2016a and a second subsequent filter 2016b, which are generically referred to as "subsequent filter 2016" or "subsequent filters 2016", a first combining unit 2018, a second combining unit 2020, a demodulator 2022, and a control unit 2024. The first combining unit 2018 includes a weight derivation unit 2030, a first multiplier 2032a and a second multiplier 2032b, which are generically referred to as "multiplier 2032" or "multipliers 2032", an adder 2034, a synchronous detector 2060, a storage 2062. The second combining unit 2020 includes a first multiplier 2036a and a second multiplier 2036b, which are generically referred to as "multiplier 2036" or "multipliers 2036" and an adder 2038.

Each of a plurality of antennas 2010 receives signals broadcast from not-shown broadcast stations. The signals received by the antennas 2010 are the aforementioned hybrid signals. FIGS. 15A and 15B each shows the spectrum of a signal received by the receiving apparatus 2100. The horizontal axis in FIGS. 15A and 15B represents the frequency, whereas the vertical axis represents the electric power. As shown in FIGS. 15A and 15B, OFDM signals, which are digital signals, are frequency-division multiplexed within the band of the existing analog FM signal and also on the sidebands on the both sides of the band thereof. In FIG. 15A, an analog FM signal is allocated in a frequency band ranging from a frequency $f_1$ to a frequency $f_2$ with a center frequency fc.

Further, a first OFDM signal is allocated to a low-frequency-side sideband, and a second. OFDM signal is allocated to a high-frequency-side sideband. The first OFDM signal and the second OFDM signal are hereinafter generically referred to as "OFDM signal". Here, the first OFDM signal is assigned in a frequency band ranging from the frequency $f_L$ to frequency $f_1$, and the second OFDM signal is assigned in a frequency band ranging from the frequency $f_2$ to frequency $f_U$. Each OFDM signal is composed of multiple subcarriers. Known signals are assigned to a part of the multiple carriers. Note here that subcarriers to which known signals are assigned are predetermined.

Similarly to FIG. 15A, a first OFDM signal, an analog FM signal and a second OFDM signal are assigned in FIG. 15B. In FIG. 15B, a first enhanced signal is further allocated to a high-frequency side of the first OFDM signal, and a second enhanced signal is further allocated to a low-frequency side of the second OFDM signal. The first enhanced signal and the second enhanced signal are assigned to within the analog FM signal, and are each constituted by an OFDM signal similarly to the first OFDM signal. The first enhanced signal is assigned in a frequency band ranging from the frequency $f_1$ to frequency $f_3$, and the second enhanced signal is assigned in a frequency band ranging from the frequency $f_4$ to frequency $f_2$. Note that the first enhanced signal and the second enhanced signal are hereinafter generically referred to as "enhanced signal". The first enhanced signal and the second enhanced signal contain information which is not stored in the first and second OFDM signals. Also, the known signals may be assigned to a part of subcarriers in the enhanced signals. Now refer back to FIG. 14.

The RF units 2012 are arranged in one-to-one correspondence to a plurality of antennas 2010. The RF unit 2012 receives a signal received by the antenna 2010 (hereinafter referred to as "received signal"). Here, the received signal is a radiofrequency signal. The RF unit 2012 carries out frequency conversion of received radiofrequency signal so as to generate a baseband received signal (hereinafter referred to as "received signal"). The baseband signal, which is composed of in-phase components and quadrature components, shall generally be indicated by two signal lines. For the clarity of figure, however, the baseband signal is presented here by a single signal line only. Also, the RF unit 2012 includes a low noise amplifier (LNA), a mixer and an A-D converter. Further, the RF unit 2012 outputs the received signal to the preceding filter 2014.

The preceding filters 2014 are arranged in one-to-one correspondence to the RF units 2012, and the preceding filters 2014 receive the received signals fed from the RF units 2012. The preceding filter 2014 band-limits the received signal. For example, the preceding filter 2014 is constituted by a low-pass filter. Here, the preceding filter 2014 is provided for the purpose of reducing a harmonic component contained in the received signal. Thus, the preceding filter 2014 has such a bandwidth as to contain the full band of the hybrid signal shown in FIGS. 15A and 15B. The preceding filter 2014 outputs the band-limited received signal (hereinafter this signal will also be referred to as "received signal") to the second combining unit 2020 and the subsequent filter 2016.

Figure 16:
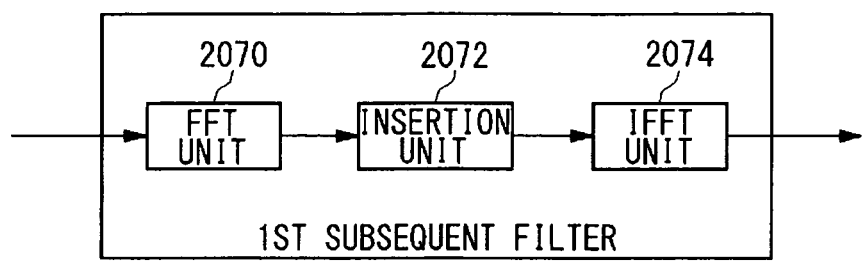
FIG. 16 shows a structure of a first subsequent filter shown in FIG. 14.

The subsequent filters 2016a and 2016b are arranged corresponding to the preceding filters 2014a and 2014b, respectively, and the subsequent filters 2016 receive the received signals fed from the preceding filters 2014. The subsequent filter 2016 extracts known-signal components contained in the OFDM signal from the received signal. FIG. 16 shows a structure of the first subsequent filter 2016a. The first subsequent filter 2016a includes an FFT unit 2070, an insertion unit 2072, and an IFFT unit 2074. The second subsequent filter 2016b is also configured similarly to the first subsequent filter 1026a shown in FIG. 16. The FFT unit 2070 performs FFT on the received signals so as to convert time-domain received signals into frequency-domain received signals. As a result, the OFDM signals and enhanced signals shown in FIGS. 15A and 15B are divided into multiple subcarrier components. Also, the analog FM signal is divided into frequency components corresponding to multiple subcarriers. For convenience of explanation, the frequency components corresponding to the multiple subcarriers are also called the subcarrier components. The FFT unit 2070 outputs the frequency-domain received signals to the insertion unit 2072.

The insertion unit 2072 receives the frequency-domain received signals fed from the FFT unit 2070. As described above, known signals are assigned to a part of subcarriers contained in the OFDM signals in the received signals. The insertion unit 2072 inserts zeros into subcarriers that differ from those to which known signals are assigned, in the OFDM signals, and inserts zeros into subcarriers corresponding to the analog FM signal. If known signals are also assigned to subcarriers of a part of enhanced signal, the insertion unit 2072 will also insert zeros to subcarriers that differ from the aforementioned subcarriers. This is equivalent to extracting the known signals contained in the received signal. The insertion unit 2072 outputs the received signal to which zeros have been inserted, to the IFFT unit 2074. The IFFT unit 2074 receives the received signal to which zeros have been inserted by the insertion unit 2072. The IFFT unit 2074 performs IFFT on the received signal so as to convert the frequency-domain received signal into the time-domain received signal. The IFFT unit 2074 outputs the time-domain received signal (hereinafter this signal will also be referred to as "received signal") to the first combining unit 2018. Now refer back to FIG. 14.

The synchronous detector 2060 receives the received signal fed from the subsequent filter 2016. The synchronous detector 2060 detects the synchronous timing for the received signals. For example, the synchronous detector 2060 calculates a value of correlation between the signal stored beforehand and the received signal; when the correlation value becomes larger than a threshold value, the synchronous detector 2060 detects it as the synchronous timing. The synchronous detector 2060 conveys the synchronous timing to the weight derivation unit 2030. The weight derivation unit 2030 receives not only the received signal from each subsequent filter 2016 but also an array-synthesis result fed from the control unit 2024 described later (hereinafter referred to as "first array-synthesis result"). With the timing when the synchronous timing sent from the synchronous detector 2060 is received, the weight derivation unit 2030 starts to derive a weight vector using the MMSE criterion.

As described above, only the subcarrier components to which known signals are assigned are contained in the received signal. The weight derivation unit 2030 stores an ideal signal waveform pattern associated with said subcarrier components. The weight derivation unit 2030 compares the first array-synthesis result with the ideal signal waveform pattern so as to generate an error signal, and also derives a weight vector using the received signal in such a manner as to reduce the error signal. In this manner, the weight derivation unit 2030 derives the weight vector by applying an adaptive algorithm, such as LMS (Least Mean Square) algorithm or RLS (Recursive Least Square) algorithm, to the known signals.

The weight derivation unit 2030 outputs the thus derived weight vector to the multiplier 2032 and the multiplier 2036. The multiplier 2032 multiplies the received signal fed from the subsequent filter 2016 by the weight vector fed from the weight derivation unit 2030, and the adder 2034 sums up the multiplication results obtained in the multiplier 2032. In other words, the multiplier 2032 and the adder 2034 perform array synthesis on the received signals fed from the subsequent filter 2016, using the weight vector. The adder 2034 outputs the first array-synthesis result to the weight derivation unit 2030.

The multiplier 2036 multiplies the received signal, namely the hybrid signal, fed from the preceding filter 2014 by the weight vector fed from the weight derivation unit 2030, and the adder 2038 sums up the multiplication results obtained in the multiplier 2036. The summed-up result is herein below called a second array-synthesis result. In other words, the multiplier 2036 and the adder 2038 perform array synthesis on the received signals fed from the preceding filter 2014, using the weight vector. The adder 2038 outputs the second array-synthesis result to the demodulator 2022. The demodulator 2022 receives the second array-synthesis result from the adder 2038 and demodulates the second array-synthesis result. Here, the second array-synthesis result, which is the hybrid signal, contains analog FM signal and OFDM signals. The demodulator 2022 demodulates the OFDM signals in the second array-synthesis result. More specifically, the demodulator 2022 performs FFT on the second array-synthesis result so as to generate a second array-synthesis result in the frequency domain.

The demodulator 2022 extracts multiple subcarrier components, corresponding to the OFDM signals, from the frequency-domain second array synthesis result, and demodulates the multiple subcarrier components. If the enhanced signals are contained in the second array-synthesis result, the demodulator 2022 will demodulate also the enhanced signals in a similar manner analogous to the OFDM signals. The result of the demodulation is equivalent to the audio signals and additional information, for instance. Note that the demodulator 2022 may perform analog FM demodulation on the analog FM signal contained in the second array-synthesis result. A known technique may be used for the analog FM demodulation and therefore the description thereof is omitted here. The demodulator 2022 may combine the audio signals, obtained by the demodulation of the OFDM signals, with the audio signals obtained as a result of the analog FM demodulation. The control unit 2024 controls the timing of the receiving apparatus 2100 as a whole.

This structure may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

A description is next given of still another modification of the exemplary embodiment. Similar to the previous modifications, the still another modification relates also to a receiving apparatus, having a configuration of adaptive array antenna, which receives hybrid signals. The above-described receiving apparatuses derive the weight vector, based on the OFDM signals in the hybrid signal, particularly the known signals and perform array synthesis on the hybrid signals using the weight vector. In contrast, a receiving apparatus according to the still another modification derives a weight vector based on the analog FM signal in the hybrid signal, and performs array synthesis on the hybrid signal, using the thus derived weight vector. The use of analog FM signal makes it possible to use the CMA and therefore eliminates the known signal used to derive the weight vector.

Figure 17:
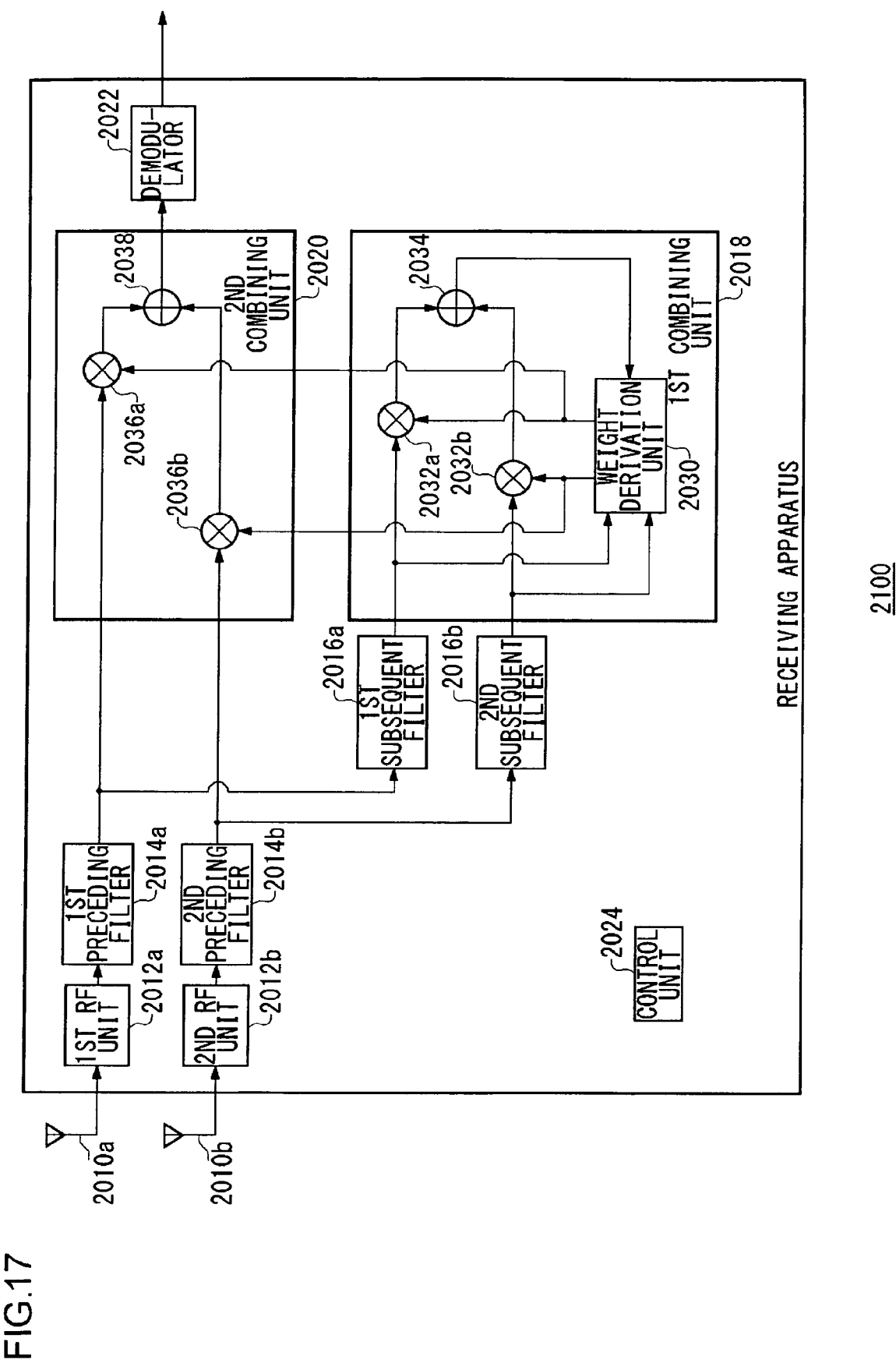
FIG. 17 shows a structure of a receiving apparatus according to still another modification of the exemplary embodiment.

FIG. 17 shows a structure of a receiving apparatus 2100 according to the still another modification of the exemplary embodiment. The receiving apparatus 2100 includes a first antenna 2010a and a second antenna 2010b, which are generically referred to as "antenna 2010" or "antennas 2010", a first RF unit 2012a and a second RF unit 2012b, which are generically referred to as "RF unit 2012" or "RF units 2012", a first preceding filter 2014a and a second preceding filter 2014b, which are generically referred to as "preceding filter 2014" or "preceding filters 2014", a first subsequent filter 2016a and a second subsequent filter 2016b, which are generically referred to as "subsequent filter 2016" or "subsequent filters 2016", a first combining unit 2018, a second combining unit 2020, a demodulator 2022, and a control unit 2024. The first combining unit 2018 includes a weight derivation unit 2030, a first multiplier 2032a and a second multiplier 2032b, which are generically referred to as "multiplier 2032" or "multipliers 2032", and an adder 2034. The second combining unit 2020 includes a first multiplier 2036a and a second multiplier 2036b, which are generically referred to as "multiplier 2036" or "multipliers 2036" and an adder 2038.

The subsequent filters 2016a and 2016b are arranged corresponding to the preceding filters 2014a and 2014b, respectively, and the subsequent filters 2016 receive the received signals fed from the preceding filters 2014. Similar to the preceding filter 2014, the subsequent filter 2016 band-limits the received signal. The subsequent filter 2016 reduces OFDM signal components in the OFDM signals and analog FM signals contained in the received signals. Hence, the bandwidth of the subsequent filter 2016 is narrower than that of the preceding filter 2014. The subsequent filter 2016 outputs the band-limited received signal (hereinafter this signal will also be referred to as "received signal") to the first combining unit 2018.

The weight derivation unit 2030 receives the received signal fed from each subsequent filter 2016, and also receives an array-synthesis result fed from the control unit 2024 described later (hereinafter referred to as "first array-synthesis result"). The weight derivation unit 2030 derives a weight vector based on the received signal so that the first array-synthesis result can be brought closer to a constant envelope magnitude by CMA. In so doing, an adaptive algorithm such as LMS algorithm or RLS algorithm is used. Note that known techniques may be used as CMA, LMS algorithm and RLS algorithm and therefore the description thereof is omitted here. As a result of the above-described processing, the weight derivation unit 2030 outputs the weight vector to the multiplier 2032 and the multiplier 2036.

By employing the exemplary embodiment of the present invention, the band-limited received signal is used, so that the weight vector for which the main lobe is directed toward a direction different from that of the interference wave can be derived even if the interference power is large. Also, since the weight vector for which the main lobe is directed toward a direction different from that of the interference wave can be derived, the receiving characteristics can be improved. Also, array synthesis is performed on the received signal that is not band-limited, using the weight vector, so that the degradation in sound quality can be suppressed. Also, array synthesis is performed on the received signal that is not band-limited, using the weight vector for which the main lobe is directed toward a direction different from that of the interference wave. Thus, the receiving characteristics can be improved while the degradation in sound quality is being suppressed even in the environment where the interference signals are present. Also, the bandwidth of the subsequent filter is made narrower than that of the preceding filter, so that the adverse effects of the interference wave on the derivation of the weight vector can be reduced. Also, since the bandwidth of the subsequent filter is adjusted according to the received power of interference wave, the bandwidth according to the receiving condition can be set. Also, since the bandwidth according to the receiving condition is set, the receiving characteristics can be improved.

Also, the received signal that is to be subjected to array synthesis is delayed for a period of time longer than that for the derivation of the weight vector. Hence, the weight vector corresponding to a future timing can be derived for the received signal. Also, since the weight vector corresponding to a future timing is derived for the received signal, the variation in propagation environment can be promptly reflected. Also, since weight vector having reflected promptly the variation in propagation environment is derived, the receiving characteristics can be improved. Also, since the weight vector is switched from the first weight vector to the second weight vector when the error and/or variation range of error become small, the error can be made smaller superficially. Also, since the error is made smaller superficially, the convergence time of the weight vector can be shortened. Also, since the convergence time of the weigh vector is shortened, the receiving characteristics can be improved. Also, since the structure and method implemented in the exemplary embodiment can be used for the received signals in which analog FM signals and OFDM signals are multiplexed, so that the range of application can be expanded.

Also, since the band-limited received signal is used, the weight for which the main lobe is directed toward a direction different from that of the interference wave can be derived even if the interference power is large. Also, since the weight vector for which the main lobe is directed toward a direction different from that of the interference wave is obtained, the receiving characteristics can be improved. Also, array synthesis is performed on the received signal that is not band-limited, using the weight vector, so that the degradation in sound quality can be suppressed. Also, array synthesis is performed on the received signal that is not band-limited, using the weight vector for which the main lobe is directed toward a direction different from that of the interference wave. Thus, the receiving characteristics can be improved while the degradation in sound quality is being suppressed even in the environment where the interference signals are present. Also, the bandwidth of the subsequent filter is made narrower than that of the preceding filter, so that the adverse effects of the interference wave on the derivation of the weight vector can be reduced.

Also, the weight vector is derived for the signals in which zeros are inserted into subcarriers that differ from those to which known signals are assigned. Thus, the adaptive array processing can be performed on the received signals in which OFDM signals and analog FM signals are combined together. Also, since the adaptive array processing is performed on the received signals in which OFDM signals and analog FM signals are combined together, the receiving characteristics can be improved. Also, since the weight vector is derived after zeros have been inserted into the analog FM signal components, the weight vector can be derived even if the OFDM signals are assigned to the band of the analog FM signal.

Also, since the weight vector is derived even if the OFDM signals are assigned to the band of the analog FM signal, the adaptive array processing can be performed on all the digital signals as well. Also, since the adaptive array processing is performed on the highly reliable OFDM signals, the control precision can be improved. Also, the weight vector is derived, based on CMA, for the analog FM signals in the received signals that contain the analog FM signals and OFDM signals. Thus, the adaptive array processing can be performed also on the received signals in which OFDM signals and analog FM signals are combined together. Also, since CMA is performed, the adaptive array processing can be performed without the known signals.

The present invention has been described based on the exemplary embodiments. The exemplary embodiments are intended to be illustrative only, and it is understood by those skilled in the art that various other modifications to constituting elements and processes could be further developed and that such modifications are also within the scope of the present invention.

The two antennas 10 are provided in the exemplary embodiment of the present invention. However, the number of antennas 10 used is not limed thereto and three or more antennas 10 may be provided. According to this modification, the degree of freedom in structure of the receiving apparatus 100 can be improved.

The two antennas 1010 are provided in another modification of the exemplary embodiment. However, the number of antennas 1010 used is not limed thereto and three or more antennas 1010 may be provided. According to this modification, the degree of freedom in structure of the receiving apparatus 1100 can be improved.

The two antennas 2010 are provided in still another modifications of the exemplary embodiment. However, the number of antennas 2010 used is not limed thereto and three or more antennas 2010 may be provided. According to these modifications, the degree of freedom in the structure of the receiving apparatus 2100 can be improved.

While the preferred embodiments of the present invention have been described using specific terms, such description is for illustrative purposes only, and it is to be understood that changes and variations may be further made without departing from the spirit or scope of the appended claims.

What is claimed is:

1. A receiving apparatus comprising:
   an input unit configured to receive a plurality of received signals corresponding respectively to a plurality of antennas;
   a band limiting unit configured to band-limit the plurality of received signals, respectively, received from said input unit;
   a first combining unit configured to derive a weight vector for the plurality of received signals which have been band-limited by said band limiting unit and configured to perform array synthesis on the plurality of received signals which have been band-limited by said band limiting unit, using the derived weight vector;
   a second combining unit configured to perform array synthesis on the plurality of received signals received from said input unit, using the weight vector derived by said first combining unit; and
   an output unit configured to output an array-synthesis result in said second combining unit;
   a measurement unit configured to measure an interference power in a band adjacent to a desired band of the array-synthesis result to be outputted from said output unit; and
   a regulating unit configured to adjust the bandwidth of said band limiting unit, according to the interference power measured by said measurement unit.

2. A receiving apparatus comprising:
   an input unit configured to receive a plurality of received signals corresponding respectively to a plurality of antennas;
   a band limiting unit configured to band-limit the plurality of received signals, respectively, received from said input unit;
   a first combining unit configured to derive a weight vector for the plurality of received signals which have been band-limited by said band limiting unit and configured to perform array synthesis on the plurality of received signals which have been band-limited by said band limiting unit, using the derived weight vector;
   a signal delay unit configured to delay the plurality of received signals, respectively, received from said input unit;
   a second combining unit configured to perform array synthesis on the plurality of received signals delayed by said signal delay unit, using the weight vector derived by said first combining unit; and
   an output unit configured to output an array-synthesis result in said second combining unit;
   a vector delay unit configured to delay the weight vector derived by said first combining unit;
   a selector configured to select either the delayed weight vector delayed by said vector delay unit or the weight vector derived by said first combining unit and configured to output the selected weight vector to said second combining unit; and a control unit configured to control the selection made by said selector, based on convergence degree of the weight vector derived by said first combining unit, wherein the amount of delay in said vector delay unit is smaller than that in said signal delay unit.

3. A receiving apparatus according to claim 2, further comprising a monitoring unit configured to monitor error between a synthesis result in said first combining unit and a reference signal, as the convergence degree of the weight vector derived by said first combining unit, wherein when the error monitored by said monitoring unit becomes less than a threshold value, said control unit has said selector select the weight vector derived by said first combining unit.

4. A receiving apparatus according to claim 3, wherein when a predetermined period of time elapses after said control unit has had said selector select the weight vector derived by said first combining unit, said control unit has said selector select the weight vector delayed by said vector delay unit.

5. A receiving apparatus, comprising:

an input unit configured to receive a plurality of received signals corresponding respectively to a plurality of antennas, the received signals being such that Orthogonal Frequency Division Multiplexing (OFDM) signals and Frequency Modulation (FM) signals are subjected to frequency-division multiplexing;

a first conversion unit configured to convert the plurality of received signals, respectively, received from said input unit into frequency domain;

an insertion unit configured to insert zero into a subcarrier that differs from a subcarrier to which a known signal is assigned, for each of the plurality of received signals which have been converted by said first conversion unit, wherein the known signal is assigned to a subcarrier of a part of OFDM signal in each of the plurality of received signals which have been converted by said first conversion unit;

a second conversion unit configured to convert the plurality of received signals, respectively, to which zeros are inserted by said insertion unit, into time domain;

a first combining unit configured to derive a weight vector for the plurality of received signals which have been converted by said second conversion unit and configured to perform array synthesis on the plurality of received signals which have been converted by said second conversion unit, using the derived weight vector;

a second combining unit configured to perform array synthesis on the plurality of received signals received from said input unit, using the weight vector derived by said first combining unit; and an output unit configured to output an array-synthesis result in said second combining unit.

6. A receiving apparatus according to claim 5, wherein, in each of the plurality of received signals received from said input unit, a first OFDM signal is assigned to a low-frequency side of the FM signal and a second OFDM signal is assigned to a high-frequency side thereof, and wherein, for each of the plurality of received signals, said insertion unit inserts zero into a subcarrier, in the first OFDM signal, differing from a subcarrier to which the known signal is assigned, inserts zero to a subcarrier corresponding to the FM signal, and inserts zero into a subcarrier, in the second OFDM signal, differing from a subcarrier to which the known signal is assigned.

7. A receiving apparatus, comprising:

a plurality of antennas;

a first conversion unit configured to convert a plurality of received signals corresponding respectively to said plurality of antennas, into frequency domain, respectively, the received signals being such that Orthogonal Frequency Division Multiplexing (OFDM) signals and Frequency Modulation (FM) signals are subjected to frequency-division multiplexing;

an insertion unit configured to insert zero into a subcarrier that differs from a subcarrier to which a known signal is assigned, for each of the plurality of received signals which have been converted by said first conversion unit, wherein the known signal is assigned to a subcarrier of a part of OFDM signal in each of the plurality of received signals which have been converted by said first conversion unit;

a second conversion unit configured to convert the plurality of received signals, respectively, to which zeros are inserted by said insertion unit, into time domain;

a first combining unit configured to derive a weight vector for the plurality of received signals which have been converted by said second conversion unit and configured to perform array synthesis on the plurality of received signals which have been converted by said second conversion unit, using the derived weight vector;

a second combining unit configured to perform array synthesis on the plurality of received signals corresponding respectively to the plurality of antennas, using the weight vector derived by said first combining unit; and an output unit configured to output an array-synthesis result in said second combining unit.

* * * * *